(12) United States Patent
Neudecker et al.

(10) Patent No.: US 10,115,994 B2
(45) Date of Patent: Oct. 30, 2018

(54) DEVICES AND METHODS FOR REDUCING BATTERY DEFECTS

(71) Applicant: Apple Inc., Cupertino, CA (US)

(72) Inventors: Bernd Jurgen Neudecker, Los Gatos, CA (US); Shawn William Snyder, Santa Clara, CA (US); Tetsuya Ishikawa, San Jose, CA (US); Tor Collins Anderson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 504 days.

(21) Appl. No.: 14/722,077

(22) Filed: May 26, 2015

(65) Prior Publication Data

US 2015/0349371 A1 Dec. 3, 2015

Related U.S. Application Data

(60) Provisional application No. 62/165,105, filed on May 21, 2015, provisional application No. 62/003,509, filed on May 27, 2014.

(51) Int. Cl.

| | |
|---|---|
| *H01M 10/02* | (2006.01) |
| *H01M 10/04* | (2006.01) |
| *H01M 2/16* | (2006.01) |
| *H01M 6/40* | (2006.01) |
| *H01M 10/0585* | (2010.01) |
| *H01M 10/058* | (2010.01) |
| *H01M 10/052* | (2010.01) |

(Continued)

(52) U.S. Cl.
CPC ........... *H01M 10/02* (2013.01); *H01M 2/164* (2013.01); *H01M 10/0436* (2013.01); *H01M 10/0463* (2013.01); *H01M 6/40* (2013.01); *H01M 10/052* (2013.01); *H01M 10/058* (2013.01); *H01M 10/0562* (2013.01); *H01M 10/0585* (2013.01); *H01M 2004/021* (2013.01)

(58) Field of Classification Search
USPC ......................................................... 429/124
See application file for complete search history.

(56) References Cited

U.S. PATENT DOCUMENTS

| 3,353,999 A | 11/1967 | Osborn |
|---|---|---|
| 5,300,373 A | 4/1994 | Shackle |

(Continued)

FOREIGN PATENT DOCUMENTS

| CA | 2 848 164 A1 | 3/2013 |
|---|---|---|
| EP | 1460701 A2 | 9/2004 |

(Continued)

OTHER PUBLICATIONS

W. M. Haynes, ed., CRC Handbook of Chemistry and Physics, 93rd Edition (Internet Version 2013), CRC Press/Taylor & Francis, Boca Raton, FL, pp. 15-43 to 15-47. (Year: 2013).*

(Continued)

*Primary Examiner* — Barbara L Gilliam
*Assistant Examiner* — Robert S Carrico
(74) *Attorney, Agent, or Firm* — Young Basile Hanlon & MacFarlane, P.C.

(57) ABSTRACT

Solid-state battery structures and methods of manufacturing solid-state batteries are disclosed. More particularly, embodiments relate to solid-state batteries having one or more subdivided electrode layers. Other embodiments are also described and claimed.

8 Claims, 27 Drawing Sheets

(51) Int. Cl.
*H01M 10/0562* (2010.01)
*H01M 4/02* (2006.01)

(56) References Cited

U.S. PATENT DOCUMENTS

| | | | |
|---|---|---|---|
| 5,445,906 A | | 8/1995 | Hobson et al. |
| 5,547,780 A | | 8/1996 | Kagawa et al. |
| 6,495,283 B1 | | 12/2002 | Yoon et al. |
| 6,830,846 B2 | | 12/2004 | Kramlich et al. |
| 8,338,036 B2 | | 12/2012 | Doi |
| 8,518,581 B2 | | 8/2013 | Neudecker et al. |
| 8,637,349 B2 | | 1/2014 | Jenson et al. |
| 2004/0197660 A1 | * | 10/2004 | Sheem ............... H01M 10/052 429/231.95 |
| 2005/0074671 A1 | * | 4/2005 | Sugiyama ............ H01M 4/134 429/231.95 |
| 2009/0272650 A1 | * | 11/2009 | Kakuta ................ H01M 4/13 205/59 |

FOREIGN PATENT DOCUMENTS

| | | | |
|---|---|---|---|
| EP | 1460701 A3 | | 6/2006 |
| JP | 6070669 A | | 4/1985 |
| JP | 06333551 A | | 2/1994 |
| JP | 2000195482 A | * | 7/2000 |
| JP | 2002279974 A | * | 9/2002 |
| WO | 2013004922 A1 | | 1/2013 |

OTHER PUBLICATIONS

Machine translation of JP 2000-195482 A, provided by JPO (Year: 2000).*
Machine translation of JP 2002-279974 A, provided by EPO (Year: 2002).*
PCT International Search Report and Written Opinion for PCT International Appln No. PCT/US2015/032488 dated Jan. 18, 2016. (24 pages).
PCT Chapter I International Preliminary Report on Patentability (IPRP Chapter I) PCT/US2015/025611 dated Nov. 17, 2016. (10 Pages).
PCT Invitation to Pay Additional Fees and, Where Applicable, Protest Fee, for PCT/US2015/032488 dated Sep. 11, 2015.

* cited by examiner

DEVICES AND METHODS FOR REDUCING BATTERY DEFECTS

This application claims the benefit of U.S. Provisional Patent Application No. 62/003,509, filed May 27, 2014, and U.S. Provisional Patent Application No. 62/165,105, filed May 21, 2015, and this application hereby incorporates herein by reference those provisional patent applications.

BACKGROUND

Field

Embodiments relate to electrochemical devices and methods of manufacturing electrochemical devices. More particularly, embodiments relate to thin film electrochemical devices, including batteries, which incorporate one or more subdivided electrode layers.

Background Information

Solid-state batteries, such as thin-film batteries (TFBs), are known to provide better form factors, cycle life, power capability, and safety, as compared to conventional battery technologies. However, solid-state battery structures and manufacturing methods require further optimization to reduce fabrication costs and improve performance.

Referring to FIG. 1, an electrochemical cell 100, which may be incorporated in a solid-state battery, includes a first electrode, e.g., an anode layer 102, separated from a second electrode, e.g., a cathode layer 104, by an electrolyte layer 106. During manufacturing of the solid-state battery, a defect 108 may occur in the electrolyte layer 106 that causes internal short-circuiting between the electrodes. More particularly, the defect 108, which may be a crack or pinhole extending between the anode layer 102 and the cathode layer 104, can cause an internal, electronic leak through the electrolyte layer 106 during fabrication or operation of the battery. For example, an anode leak 110 may propagate through the defect 108 into the cathode layer 104, causing a chemical reaction 112 that chemically reduces or over discharges some or all of the cathode layer 104 and eventually affects the entire cathode layer 104 to degrade battery performance and/or disable the battery.

SUMMARY

Embodiments of solid-state battery structures are disclosed. In an embodiment, an electrochemical cell includes a cathode layer having a group of two or more cathode subregions that are electrically separated by one or more gaps, and an electrolyte layer between the cathode subregions and an anode layer. The cathode subregions may be electrically connected to a common cathode current collector. The cathode current collector may have a continuous layer structure such that the cathode subregions are electrically connected to each other through the continuous layer structure of the cathode current collector. In an embodiment, a combined projected surface area of the cathode subregions is at least 80 percent of a total projected surface area of what would be a "filled" or solid cathode layer, i.e., one in which the gaps between the cathode sub-regions are filled with cathode material. In an embodiment, the gaps are at least partially filled by a dielectric material, e.g., a dielectric gas. An anode current collector may be located over the anode layer. An insulating layer, such as one that is inert to lithium, may be located over the anode layer.

The one or more gaps may also be partially filled by at least one of the electrolyte layer or the anode layer. For example, the cathode subregions may include respective sidewalls that are separated by the gaps and the anode layer may have a continuous layer structure that covers the sidewalls of the cathode subregions, and thus, is disposed in the gaps between the sidewalls. In addition to separating the sidewalls, the gaps may separate a portion of the anode layer between the sidewalls from the anode current collector that extends over plateaus of the cathode subregions.

In an embodiment, the anode layer includes several anode subregions separated by the one or more gaps. For example, an electrochemical cell may include an anode layer having a discontinuous layer structure. That is, the anode layer may include several anode subregions separated by one or more gaps. An electrolyte layer may be disposed between several anode subregions and a cathode layer. In an embodiment, an anode current collector extends over the anode subregions and includes a continuous layer structure such that the anode subregions are electrically connected to each other through the continuous layer structure of the anode current collector. A combined projected surface area of the anode subregions may be less than 25 percent of a total projected surface area of what would be described as a "filled" or solid anode layer.

In an embodiment, an electrochemical device includes two electrochemical cells that include respective cathode layers covered by respective anode layers. The cathode layers may have several cathode subregions separated by a gap. The cathode subregions may be electrically connected to a common cathode current collector, i.e., the cathode subregions of each cell may be electrically connected to each other through the respective cathode current collector. In an embodiment, the cells are stacked such that the anode layer of one cell is physically connected to the anode layer of the other cell.

A tab insertion space may be disposed between the cathode current collectors of the stacked cells, and an anode current collector tab may be disposed in the tab insertion space. The anode layers of the cells may include continuous layer structures that separate the tab insertion space from respective cathode current collectors. Thus, the anode current collector tab disposed in the tab insertion space may be connected to the anode layers between the cathode current collectors. In an embodiment, an insulating layer, such as an insulating layer that is also inert to lithium, may be disposed between the cathode layers and physically connected to the anode layers.

In an embodiment, an electrochemical cell includes an anode current collector having a continuous layer structure. An anode layer may be subdivided into anode subregions that are electrically connected to each other through the continuous layer structure of the anode current collector. An electrolyte layer may be disposed between the anode subregions and a cathode layer. In an embodiment, the anode subregions are separated by a gap that extends between the anode current collector and the electrolyte layer. The gap may be at least partially filled by a dielectric material, e.g., a dielectric gas. The cell may include a cathode current collector having a continuous layer structure that is electrically connected to the cathode layer. In an embodiment, a combined projected surface area of the anode subregions is less than 25 percent of a total projected surface area of the anode layer.

In an embodiment, the cathode layer of the cell includes several cathode subregions, and at least two of the anode subregions are disposed over each cathode subregion. The cathode subregions may be separated from each other by a gap that extends between the anode current collector and the cathode current collector. The gap may be at least partially filled by a dielectric material, e.g., a dielectric gas. Furthermore, the cathode subregions may be electrically connected to each other through the continuous layer structure of the cathode current collector. A combined projected surface area of the cathode subregions may be at least 80 percent of a total projected surface area of the cathode layer.

In an embodiment, an electrochemical device includes a stack of electrochemical cells having respective anode layers. The anode layers may include several anode subregions and the cells may include respective electrolyte layers between the anode subregions and a respective cathode layer. In an embodiment, an anode current collector having a continuous layer structure is disposed between the cathode layers and is physically connected to the anode subregions of the stacked cells. Thus, the anode subregions are electrically connected to each other through the continuous layer structure of the anode current collector. The cells may also include respective cathode current collectors that are electrically connected to the cathode layers of the respective cells. In an embodiment, a combined projected surface area of the anode subregions of each cell is less than 25 percent of a total projected surface area of the anode layers of each cell.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
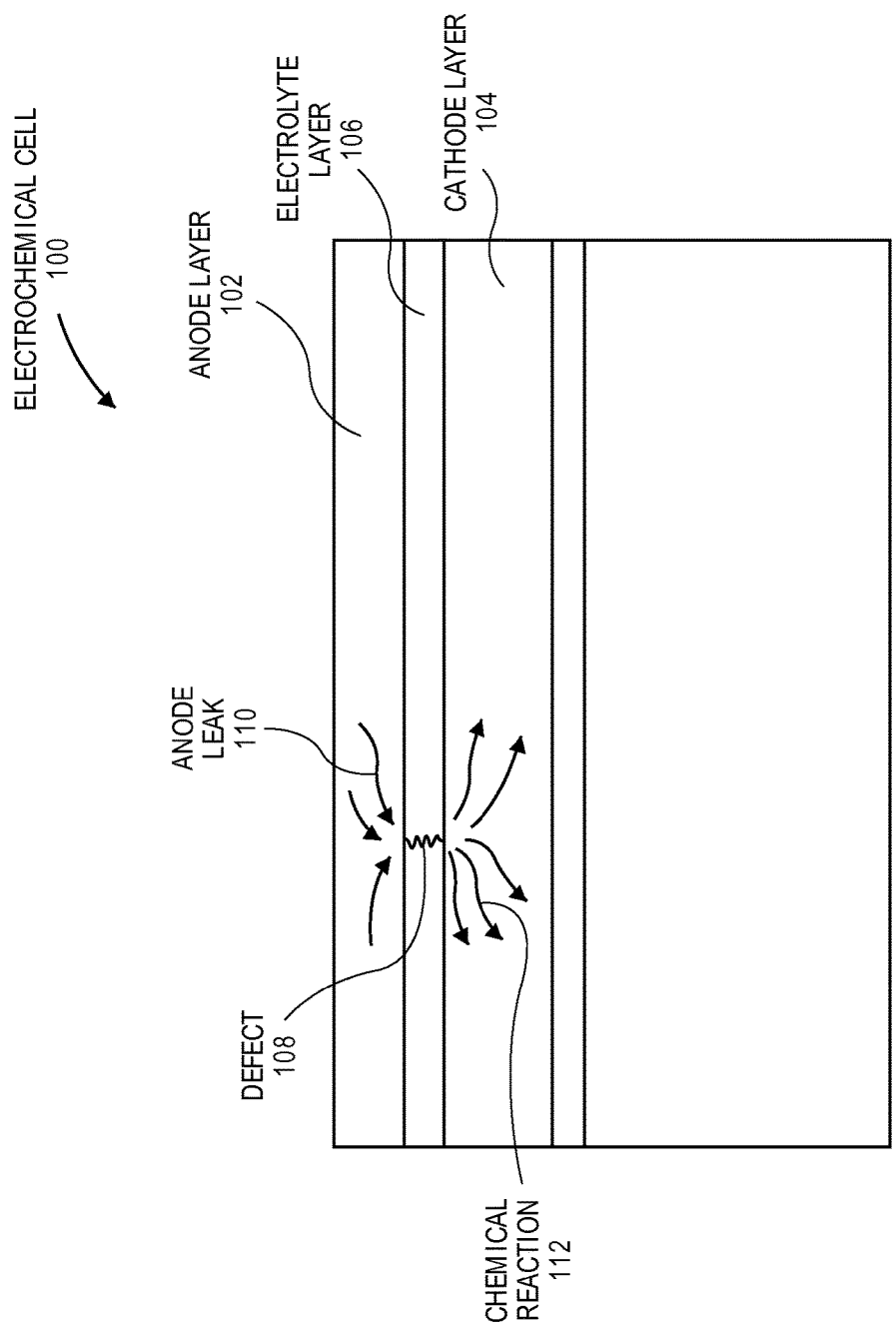
FIG. 1 is a side view of an electrochemical cell having a defect in an electrolyte layer.

Embodiments describe structures and manufacturing methods for solid-state batteries, such as thin-film batteries. However, while some embodiments are described with specific regard to manufacturing processes or structures for integration within a solid-state battery, the embodiments are not so limited, and certain embodiments may also be applicable to other uses. For example, one or more of the embodiments described below may be used to manufacture other layered elements, such as silicon-based solar cells.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

In an aspect, an electrochemical cell may include several layers, such as an electrolyte layer between an anode layer and a cathode layer. Each of the layers of the electrochemical cell may be formed in a subdivided manner. For instance, one or more of the electrode layers, i.e., the anode layer or the cathode layer, may be patterned to remove gaps as per a pattern, leaving essentially islands making up the subdivided layer. Other methods for producing a "layer" of anode or cathode islands are possible.

In an aspect, an electrochemical cell having a cathode layer subdivided into cathode subregions is provided. For example, the cathode layer may be subdivided into several rectangular subregions separated by gaps between the subregions. Thus, each subregion may be isolated from the others, and accordingly, an anode leak that chemically reacts within one cathode subregion will not propagate to or affect the other cathode subregions. Furthermore, the gaps may also serve to provide separations between anode layer regions that are disposed over the cathode subregions, to limit the anode material that will leak into the cathode subregions, before an open circuit forms between a defect in the electrolyte layer and an anode current collector. In an embodiment, the cathode subregions may be electrically connected and physically coupled to a common, or shared, cathode current collector. Thus, the cathode subregions may be electrically connected to each other through the cathode current collector. For instance, the cathode subregions may be directly connected to the common cathode current collector, or one or more intermediate layers, such as a barrier film layer, may couple the cathode subregions with the common cathode current collector. Accordingly, fabrication yield may be increased and the electrochemical cell may be more resistant to degradation caused by anode leaks.

In an aspect, an electrochemical cell having an anode layer subdivided into anode subregions is provided. For example, the anode layer may be subdivided into several rectangular subregions separated by one or more gaps between the subregions. In another embodiment, a subdivided anode layer having patterned anode islands may be disposed over a subdivided cathode layer. Thus, one or more anode subregions may be located over one cathode subregion. In any case, the total projected surface area of the anode subregions may occupy a fraction of the total projected surface area of what would be the "filled" or solid anode layer. Accordingly, the probability of a defect in an electrolyte layer being adjacent to a particular anode subregion is reduced, and even if the defect does contact an anode subregion, a resulting anode leak may drain one anode subregion (thereby essentially removing that sub-region from operation) but not the other anode subregions. Furthermore, as the isolated anode subregion leaks, one or more gaps may form between the portion of the electrolyte layer that is adjacent to that anode subregion and an anode current collector; this helps reduce the likelihood of electrical discharge occurring in neighboring anode subregions (through the anode current collector and the defect). Accordingly, fabrication yield may be increased and the electrochemical cell may be more resistant to degradation caused by anode leaks.

In an aspect, an electrochemical cell having a repaired defect in an electrolyte layer is provided. More particularly, the electrochemical cell may be modified in a precursor state or in an assembled state to reduce the likelihood of an anode leak that could degrade the cathode layer. A repair may include filling and/or backfilling a portion of the electrolyte layer that includes the defect. A repair may include removing that portion of the anode layer that lies over the defect, and accordingly, the anode layer cannot leak through the defect into the cathode layer. A repair may include forming a channel around the defect such that even if an anode leak does occur, a first portion of the cathode layer that lies under the defect would be isolated from a second portion of the cathode layer, and thus, degradation of the cathode layer would be limited to degradation of the first portion.

Figure 2:
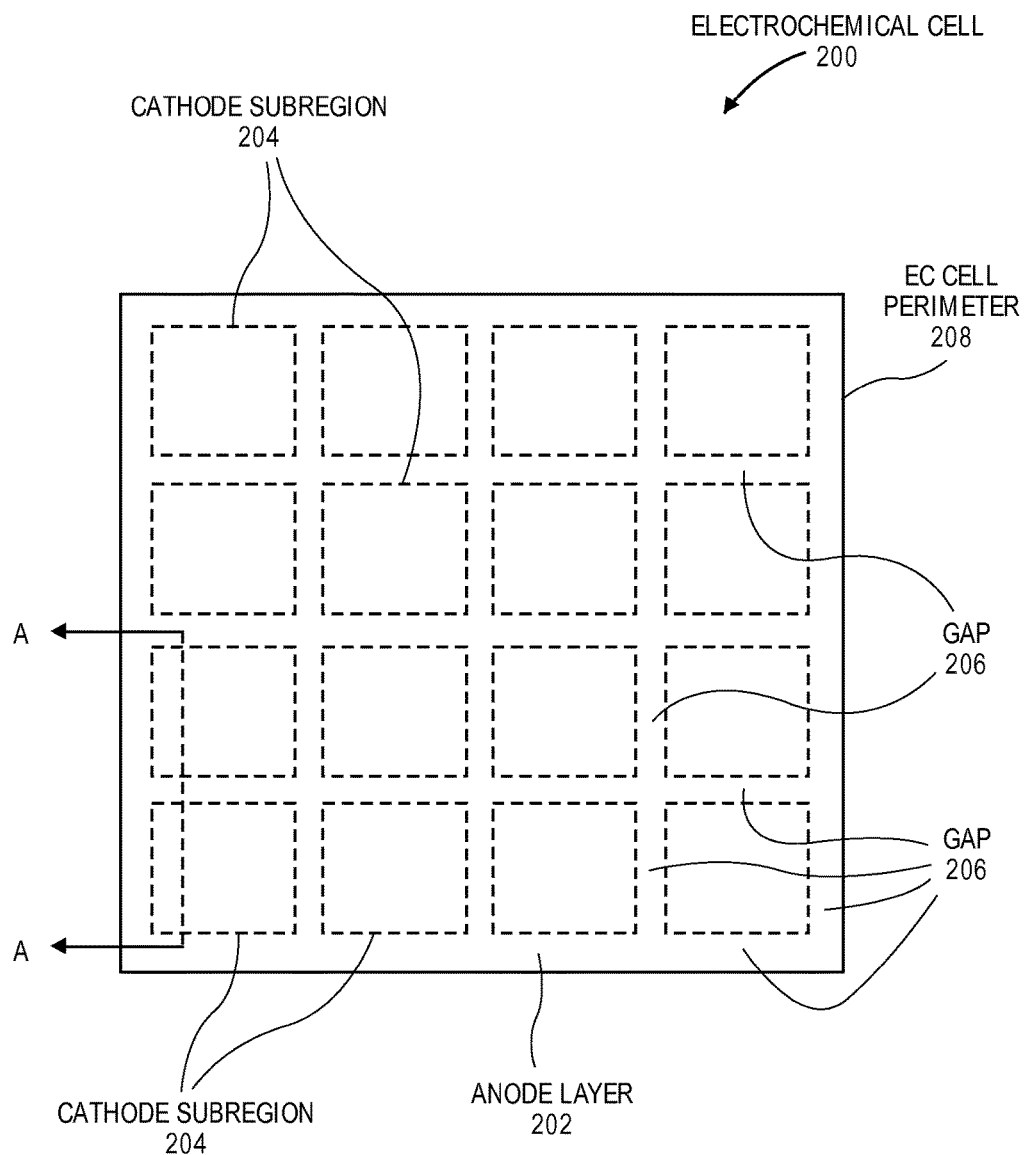
FIG. 2 is a plan view of an electrochemical cell having a subdivided cathode layer in accordance with an embodiment.

Referring to FIG. 2, a plan view of an electrochemical cell having a subdivided cathode layer is shown in accordance with an embodiment. An electrochemical cell 200 may include an anode layer 202 over a cathode layer. Furthermore, the cathode layer may be subdivided into one or more cathode subregions 204, shown with hidden lines in FIG. 2, spaced and patterned across the electrochemical cell 200 beneath the anode layer 202. More particularly, the cathode subregions 204 may be separated from each other by one or more gaps 206. For example, one or more gaps 206 may surround each cathode subregion 204 to physically isolate the cathode subregion 204 from neighboring cathode subregions 204.

In an embodiment, the cathode layer may include a grid pattern, in which each cathode subregion 204 includes a rectangular surface area and is separated from adjacent cathode subregions 204 by one or more linear gaps 206 traversing the electrochemical cell 200. That is, the cathode layer may have several cathode subregions 204 and one or more gaps 206 arranged like city blocks and streets. The grid pattern and city block metaphor may lend itself to fabrication. For example, laser scribing may be used to remove cathode layer material and form one or more gaps 206 between cathode subregions 204 after deposition of the cathode material over a substrate or after connecting the cathode material to a cathode current collector. Alternatively, shadow masking may be used to form cathode subregions 204 separated by masked regions that become the unfilled one or more gaps 206. However, other cathode layer patterns may be used. For example, the one or more gaps 206 may be laser scribed in any shape to form isolated cathode subregions 204 that are, e.g., polygonal, conic sections, elliptical, etc., islands. The cathode subregions 204 may have a same or different shape as compared to other cathode subregions 204 in the cathode layer.

Regardless of the shape of the cathode subregions 204, the cathode layer may include a total projected surface area within an electrochemical cell perimeter 208 when viewed from above, which includes a combined surface area of each cathode subregion 204 and a combined surface area of each gap 206. For example, each cathode subregion 204 may have a projected area of a square profile with equal sides. Furthermore, each gap 206 may be formed by ablating through the cathode layer with a laser beam to create a grid of trenches with equal widths, i.e., trenches devoid of cathode material. Thus, a total projected surface area of the cathode layer within an electrochemical cell perimeter 208 may include all of the square projected surface areas as well as the projected surface area within the one or more gaps. In an embodiment, a patterned cathode area utilization, i.e., a ratio of the combined individual cathode subregion projected surface areas to the total projected surface area of the cathode layer, may be greater than 75%, with an error percentage of 2-5%. For example, the patterned cathode area utilization may be at least 80%, with an error percentage of 2-5%. In an embodiment, a grid pattern has square cathode subregions 204 with sides of 100 micron separated by one or more 10 micron gaps. Thus, the patterned cathode area utilization may be expected to be 83%. Narrowing the one or more gaps 206 or enlarging the cathode subregions 204 can increase the patterned cathode area utilization.

Figure 3:
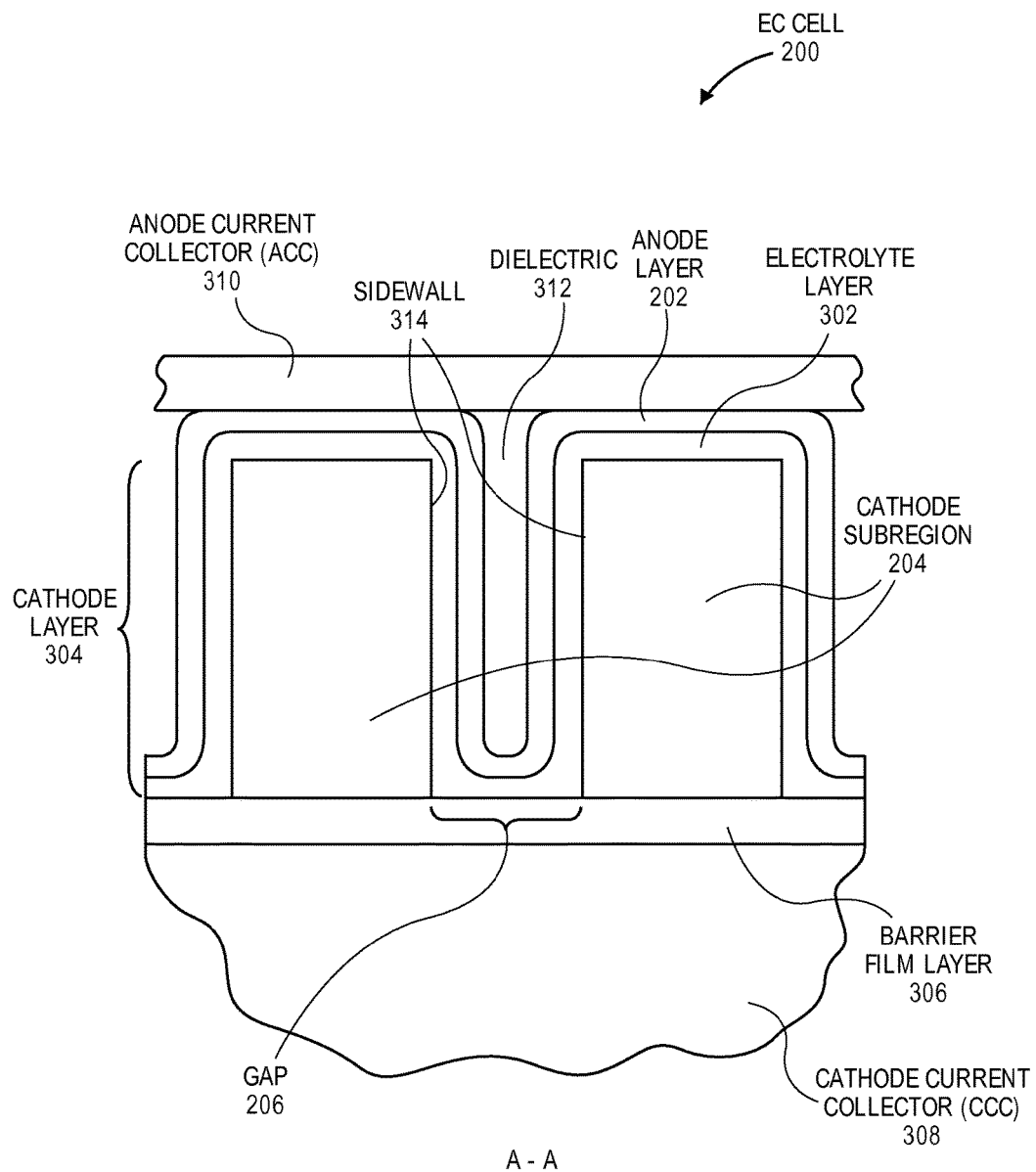
FIG. 3 is a cross-sectional view, taken about line A-A of FIG. 2, of an electrochemical cell having a subdivided cathode layer in accordance with an embodiment.

Referring to FIG. 3, a cross-sectional view, taken about line A-A of FIG. 2, of an electrochemical cell having a subdivided cathode layer is shown in accordance with an embodiment. In an embodiment, the electrochemical cell 200 may include an electrolyte layer 302 between the anode layer 202 and the cathode layer 304, and more particularly, between the anode layer 202 and one or more cathode subregions 204. Furthermore, a barrier film layer 306 may optionally be between the cathode layer and a cathode current collector 308. In an embodiment, cathode current collector 308 may have a continuous layer structure, e.g., a continuous sheet or film, extending under the one or more cathode subregions 204. As described above, each of the cathode subregions 204 may be separated by one or more gaps 206, which defines a space between the cathode subregions 204 within the cathode layer 304. Thus, the cathode subregions 204 may be electrically connected to each other through the continuous layer structure of cathode current collector 308.

A continuous layer structure as used throughout this specification may be, but need not be, a completely filled layer. That is, a continuous layer structure may include one or more local discontinuities, such as holes, gaps, voids, etc. through a thickness of the layer, making the layer physically discontinuous, but the layer may nonetheless be electrically continuous in that an electrical potential at one location on the continuous layer structure may be essentially equal to an electrical potential at any other location on the continuous layer structure. Likewise, a continuous layer structure may be physically continuous, having no discontinuities along a layer surface, but may nonetheless be electrically discontinuous, e.g., as in the case of an insulating layer with different electrical potentials at different locations along the surface. Thus, a continuous layer structure may be one or more of physically continuous and/or electrically continuous.

The patterned cathode material of the cathode layer 304, i.e., the cathode subregions 204, may, for example, include $LiCoO_2$, $LiMn_2O_4$, $LiMnO_2$, $LiNiO_2$, $LiFePO_4$, $LiVO_2$, or any mixture or chemical derivative thereof. The electrolyte layer 302 may facilitate ion transfer between the cathode subregions 204 and the anode layer 202. Accordingly, the electrolyte layer 302 may be a solid electrolyte, which may not contain any liquid components and may not require any binder or separator materials compounded into a solid thin film. For example, the electrolyte layer 302 may include lithium phosphorous oxynitride (LiPON) or other solid state thin-film electrolytes such as $LiAlF_4$, $Li_3PO_4$ doped $Li_4SiS_4$. The anode layer 202 may, for example, include lithium, lithium alloys, metals that can form solid solutions or chemical compounds with lithium, or a so-called lithium-ion compound that may be used as a negative anode material in lithium-based batteries, such as $Li_4Ti_5O_{12}$.

In an embodiment, the cathode layer subregions 204 may be electrically connected with a cathode current collector 308, which may be an electrically conductive layer or a tab. Similarly, the anode layer 202 may be electrically connected with an anode current collector 310, which may be an electrically conductive layer or a tab. Optionally, one or more intermediate layers may be disposed between the patterned cathode material of the cathode layer 304 or the anode layer 202 and a respective current collector. For example, a barrier film layer 306 may separate the cathode subregions 204 from the cathode current collector 308. For example, the barrier film layer 306 may be in direct physical contact with the cathode subregions 204 and the cathode current collector 308. The barrier film layer 306 may reduce the likelihood of contaminants and/or ions from diffusing between the cathode current collector 308 and the cathode subregions 204. Thus, the barrier film layer 306 may include materials that are poor conductors of ions, such as borides, carbides, diamond, diamond-like carbon, silicides, nitrides, phosphides, oxides, fluorides, chlorides, bromides, iodides, and compounds thereof. Alternatively, an additional intermediate layer, such as a substrate layer may be disposed between the cathode layer 304 and the cathode current collector 308. The substrate layer may, for example, provide electrical connectivity between the cathode subregions 204 and the cathode current collector 308 and may also provide structural support, e.g., rigidity, to the electrochemical cell 200. Accordingly, the substrate layer may include a metal foil or another electrically conductive layer.

In some instances, the electrochemically active layers of the cell may be formed on one side of the substrate layer, e.g., using material deposition techniques such as physical vapor deposition, and the cathode current collector 308 may be formed separately and physically coupled to another side of the substrate layer. In other instances, the electrochemically active layers of the cell may be formed on the substrate layer, and then the electrochemically active layers may be removed from the substrate layer and physically coupled to the separately formed cathode current collector 308. In still other instances, the electrochemically active layers of the cell may be formed, e.g., physical vapor deposited, directly on the cathode current collector 308. Thus, there are many different ways to create an electrochemical cell 200 having several electrochemically active layers.

In an embodiment, the one or more gaps 206 within the patterned cathode layer 304 are at least partially filled by a dielectric 312. More particularly, sidewalls 314 of respective cathode subregions 204 may be separated by a dielectric fluid or solid, such as a dielectric gas, e.g., an inert gas. Furthermore, multiple dielectrics or other materials may occupy the one or more gaps 206. For example, the electrolyte layer 302 and/or the anode layer 202 may be deposited over the sidewalls 314 and the barrier film layer 306 to at least partially fill the one or more gaps 206 between the cathode subregions 204 of the patterned cathode layer 304. The anode layer 202 and/or electrolyte layer 302 may be deposited in a continuous layer over the cathode subregions 204, thereby forming a continuous covering across adjacent cathode subregions 204. That is, anode layer 202 and/or electrolyte layer 302 may have a continuous layer structure, e.g., a sheet or film structure. The continuous covering may both above cathode subregions 204, e.g., between cathode subregions 204 and anode current collector 310, as well as laterally between cathode subregions 204, e.g., disposed between and/or covering sidewalls 314 of adjacent cathode subregions 204. Furthermore, since one or more of anode layer 202 or electrolyte layer 302 may be disposed as a continuous layer deposited over cathode subregions 204 and at least partially filling gaps 206, apposing surfaces of the deposited layers may face each other. This is shown in FIG. 3 in which laterally facing surfaces of anode layer 202 face each other across dielectric 312, e.g., a dielectric gas. Similarly, the continuous layer structure of anode layer 202 may cover the sidewalls such that dielectric 312 separates a portion of the anode layer inside the gap 206, e.g., the portion at the bottom of gap 206 directly above barrier film layer 306, from anode current collector 310. In an embodiment, dielectric 312 is absent, and the facing surfaces of anode layer 202 touch each other, thereby completely filling at least a portion of gap 206 between adjacent cathode subregions 204. That is, apposing surfaces of anode layer 202 may touch along a bottom half of gap 206, completely filling the space between cathode subregions 204 in that lower portion, while the apposing surfaces of anode layer 202 may be separated by dielectric 312 along a top half of gap 206, in the same manner shown across the entire gap 206 in FIG. 3. Thus, the one or more gaps 206 may provide a physical and electrochemical separation between adjacent cathode subregions 204. Furthermore, the portions of anode layer 202 overlying one cathode subregion 204 may be physically separated from anode layer 202 overlying an adjacent cathode subregion 204. However, the anode layer portions overlying the cathode subregions 204 may be sandwiched between the cathode subregions 204 and an anode current collector 310.

Figure 4A:
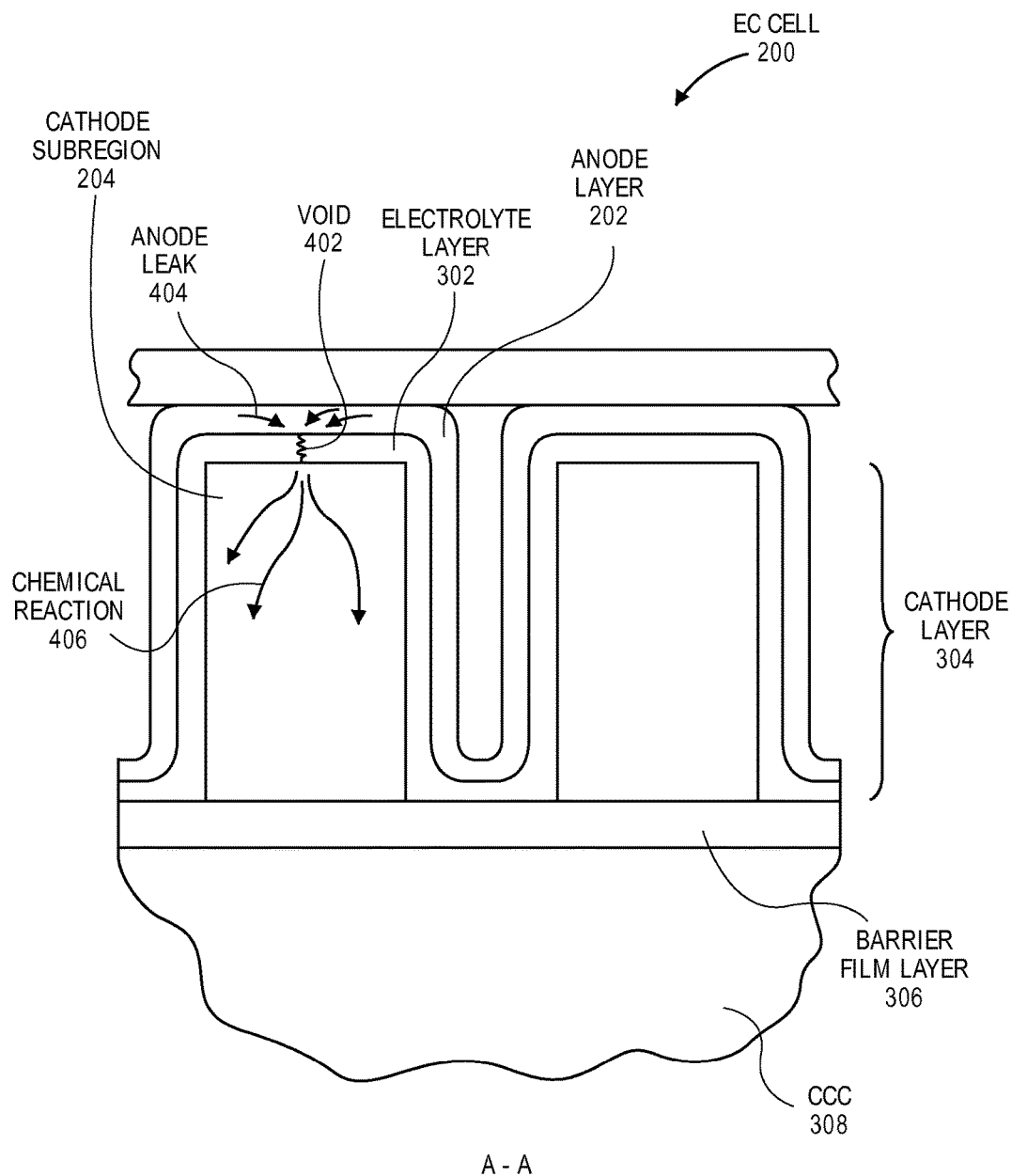
FIGS. 4A-4B are cross-sectional views, taken about line A-A of FIG. 2, of an electrochemical cell having a defect in an electrolyte layer over a subdivided cathode layer in accordance with an embodiment.

Referring to FIG. 4A, a cross-sectional view, taken about line A-A of FIG. 2, of an electrochemical cell having a defect in an electrolyte layer over a subdivided cathode layer is shown in accordance with an embodiment. In an embodiment, the electrolyte layer 302 may include a defect. The defect may include, for example, a void 402 such as a nano-crack, a micro-crack, or a pinhole. The void 402 may occur in the electrolyte layer 302 during cell fabrication or cell operation. Various causes for the void 402 include suboptimal morphology or cleanliness of any of the cathode current collector 308, the barrier film layer 306, the cathode layer 304, or the electrolyte layer 302. Furthermore, external short-circuiting, mechanical abuse, thermal abuse, etc., may generate the void 402. In any case, the void 402 can introduce a path for an electrical leak between the anode layer 202 and the cathode layer 304. That is, an anode leak 404 may occur as the anode layer 202 material creeps into a cathode subregion 204 of the cathode layer 304, through the void 402. As the anode material interacts with the cathode material, chemical reactions 406 may propagate through the cathode subregion 204 to create unwanted chemical products that degrade electrochemical cell function.

Figure 4B:
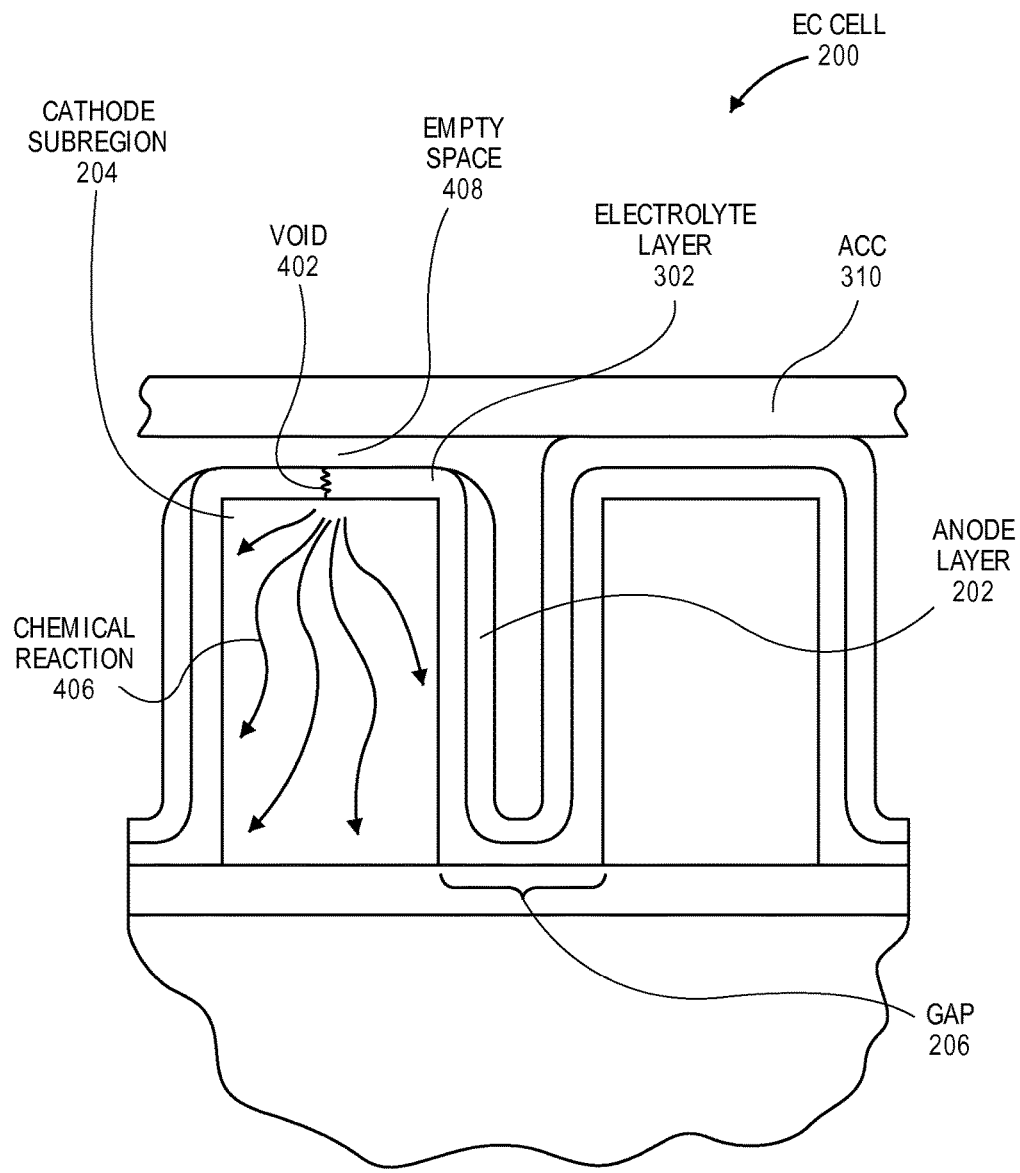

Referring to FIG. 4B, a cross-sectional view, taken about line A-A of FIG. 2, of an electrochemical cell having a defect in an electrolyte layer over a subdivided cathode layer is shown in accordance with an embodiment. As the anode leak 404 persists, chemical reactions 406 through the cathode subregion 204 may continue and be accompanied by concomitant disappearance of the anode layer 202 over the cathode subregion 204, as shown in this figure. That is, anode layer 202 material may physically leak through the void 402 until there is no longer anode material directly above void 402. Accordingly, portions of the anode layer 202 may remain within the one or more gaps 206 between cathode subregions 204, but there may be an empty space 408 created in a portion of the anode layer 202 that is above the electrolyte layer 302, e.g., between the electrolyte layer 302 and the anode current collector 310. Thus, the anode leak 404 may eventually cease, and as a result, the chemical reaction 406 in the cathode subregion 204 may stop.

Figure 5:
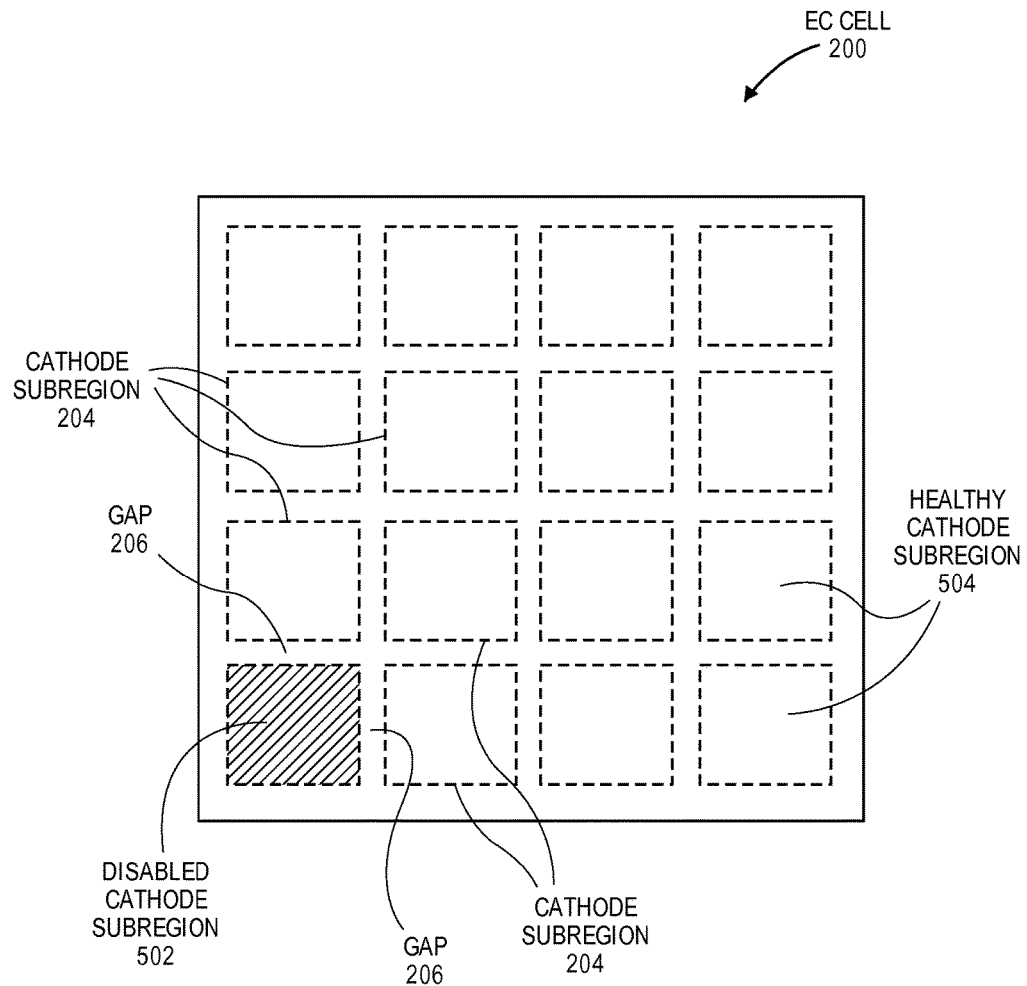
FIG. 5 is a plan view of an electrochemical cell having a neutralized cathode subregion in accordance with an embodiment.

Referring to FIG. 5, a plan view of an electrochemical cell having a neutralized cathode subregion is shown in accordance with an embodiment. In an embodiment, after the anode layer 202 has leaked into the cathode subregion 204 through the void 402, the cathode subregion 204 may be disabled, as shown by cross-hatching in FIG. 5. The one or more gaps 206 that are around the disabled cathode subregion 502 will limit the propagation of the anode material and arrest the chemical reaction 406 from expanding into adjacent cathode subregions 204. Furthermore, the empty space 408 essentially creates an open circuit between the anode current collector 310 and the disabled cathode subregion 502. Thus, since the cathode subregions 204 are essentially connected in parallel, the empty space 408 reduces the likelihood of healthy cathode subregions 204 from discharging through the unhealthy cathode subregion 502, i.e., the empty space 408 disconnects the void 402 from the remainder of the operational electrochemical cell 200.

Figure 6:
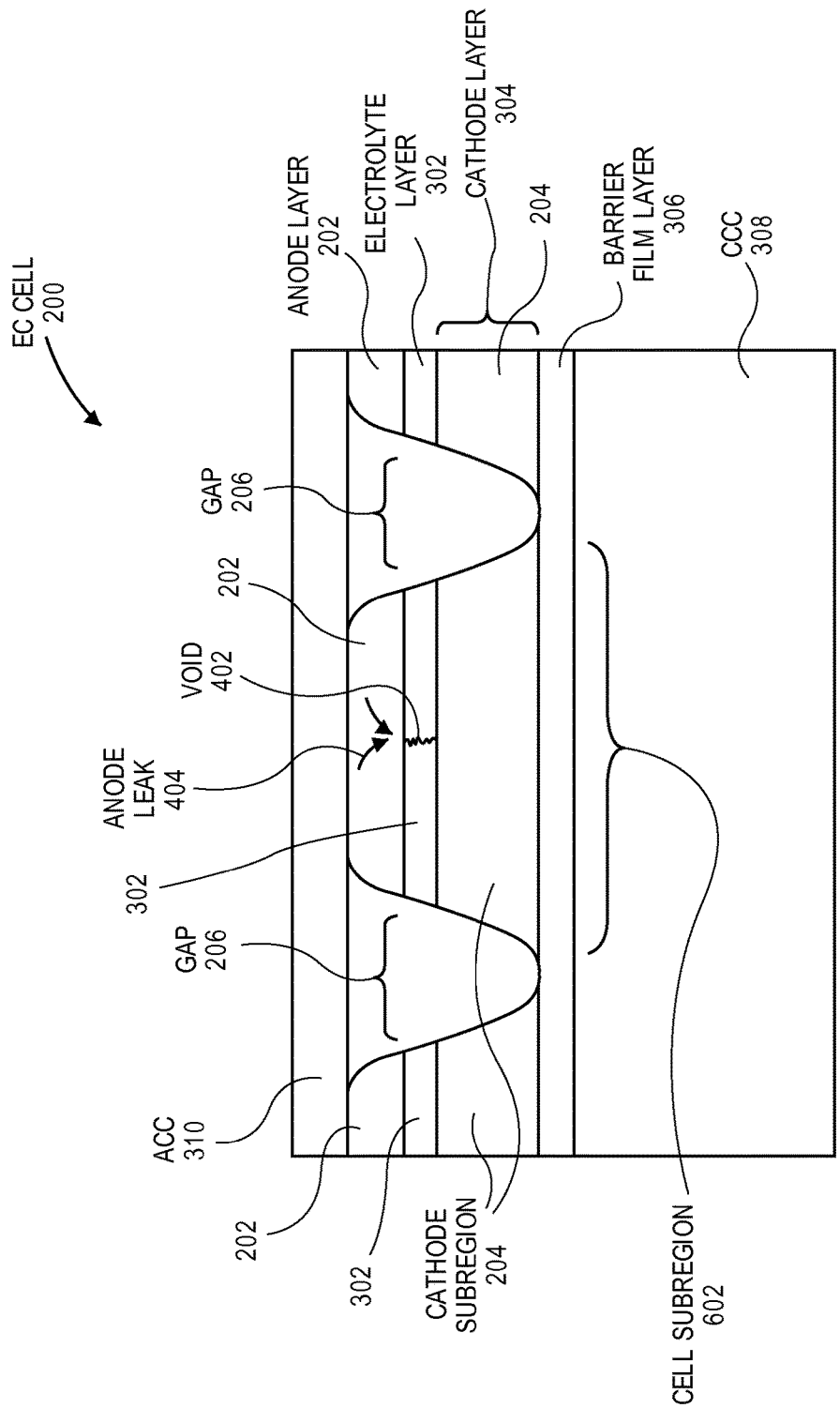
FIG. 6 is a side view of an electrochemical cell having a subdivided cathode layer in accordance with an embodiment.

Referring to FIG. 6, a side view of an electrochemical cell having a subdivided cathode layer is shown in accordance with an embodiment. In an embodiment, the cathode layer 304 includes separate cathode subregions 204 separated by one or more gaps 206 that are filled entirely by a single dielectric, e.g., a gas such as an inert gas, or a vacuum. For instance, an electrochemical cell 200 may be fabricated having essentially flat thin layers that include, the anode layer 202, the electrolyte layer 302, the cathode layer 304, the barrier film layer 306, and the cathode current collector 308. An ablation laser may then be used to laser scribe the one or more gaps 206 through the anode layer 202, the electrolyte layer 302, and the cathode layer 304. Alternatively, the one or more gaps 206 may be formed in one or more of the anode layer 202, the electrolyte layer 302, and the cathode layer 304 using masking techniques to control the areas of material deposition during fabrication of the electrochemical cell 200. A thin layer of material may be removed from barrier film layer 506 as well, e.g., using a laser ablation process, such that adjacent cathode subregions 204 are fully separated across gaps 206. As a result, several cathode subregions 204 separated by one or more gaps 206 may be formed. Similarly, the electrolyte layer 302 and the anode layer 202 may have respective subregions formed therein, separated by the one or more gaps 206. That is, rather than having a continuous layer structure as described above with respect to FIG. 3, anode layer 202 and/or electrolyte layer 302 may be patterned to have a discontinuous layer structure with several subregions formed therein. The discontinuous layer structure may be planar. That is, the subregions of the anode layer 202 and/or electrolyte layer 302 may be essentially coplanar such that sidewalls of the several subregions of each layer face each other across the one or more gaps 206 and respective upward/facing surfaces of the several subregions lie within a common transverse plane. Thus, the electrochemical cell 200 may include several cell subregions 602 physically separated from each other by the one or more gaps 206. More particularly, each cell subregion 602 may include a stack of cathode, electrolyte, and anode subregions. Furthermore, an anode current collector 310 may be placed over the anode subregions to electrically connect each and all of the cell subregions 602 so as to form a single cell. In an embodiment, the anode current collector 310 has a continuous layer structure, e.g., a single sheet or film structure. Thus, anode subregions may be electrically connected to each other through the continuous layer structure of the anode current collector 310. In an embodiment, the combined projected surface area of the cell subregions 602 may be at least 80% of the total projected surface area of the electrochemical cell 200 within the electrochemical cell perimeter 208, i.e., the patterned cathode utilization area may be at least 80%.

The electrolyte layer 302 in a cell subregion 602 may develop a void 402 during manufacture or use. In such case, the anode layer 202 in the defective cell subregion 602 may leak through the void 402 into an underlying cathode subregion 204 in the defective cell subregion 602. As described above, the anode leak 404 may persist until the anode layer 202 over the void 402 is reduced to a point that an empty space 408 is created between the void 402 and the anode current collector 310. The empty space 408 may provide an electrical open circuit to reduce the likelihood of the discharge of surrounding cell subregions 602 through the defective cell subregion 602. Furthermore, since the cathode subregion 204 of each cell subregion 602 are physically separated by one or more gaps 206, the leaking anode layer 202 material may be arrested within the defective cell subregion 602 and disallowed from propagating to other cell subregions 602. Accordingly, the negative effects of an anode leak 404 may be limited to the disablement of a single cell subregion 602.

Figure 7:
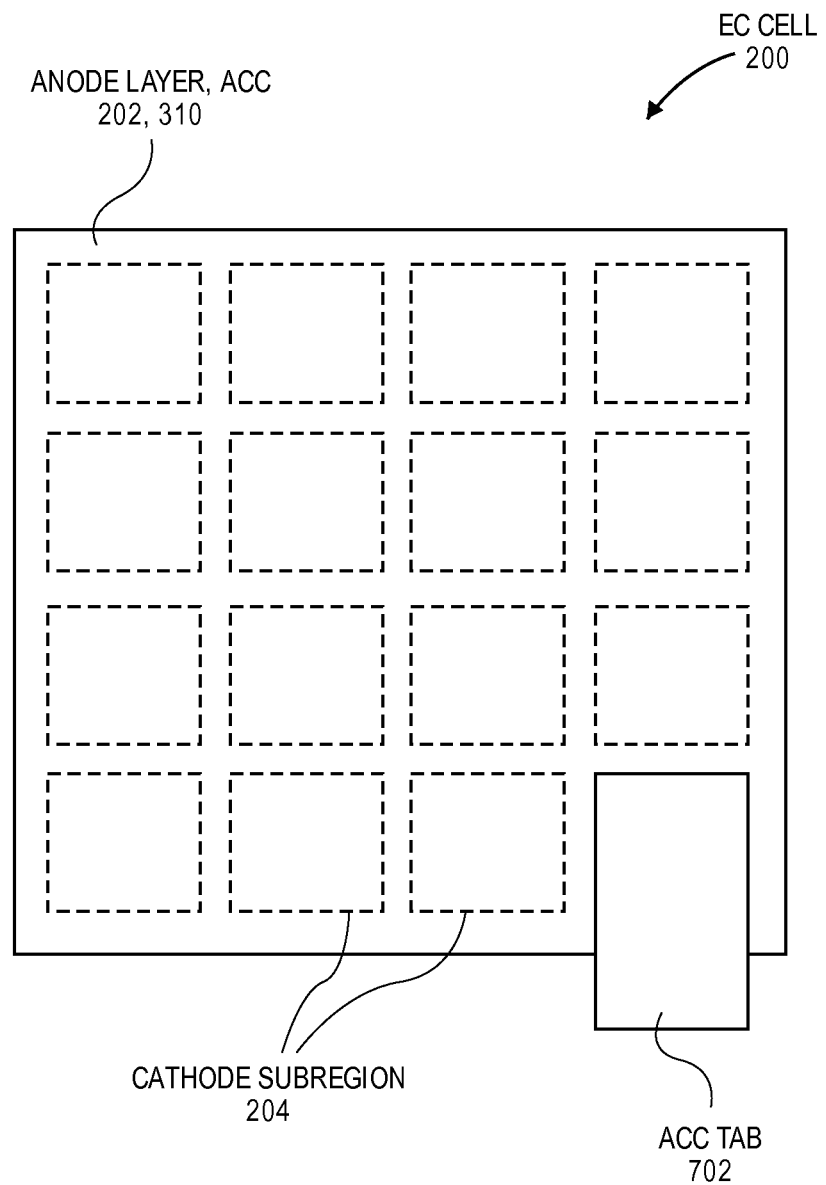
FIG. 7 is a plan view of an electrochemical cell having a subdivided cathode layer and an anode current collector tab in accordance with an embodiment.

Referring to FIG. 7, a plan view of an electrochemical cell having a subdivided cathode layer and an anode current collector tab is shown in accordance with an embodiment. In an embodiment, the anode layer 202 of the electrochemical cell 200 may also be an anode current collector. For example, the anode layer 202 may be metallic lithium with sufficient conductivity to act as a current collector across the entire face of the electrochemical cell 200. Thus, a separate anode current collector 310 over the anode layer 202 may be unnecessary. Accordingly, the anode layer 202 may be used to electrically connect the electrochemically active portions of the electrochemical cell 200 with external product circuitry. For example, the anode layer 202 may be lithium that is conductively connected with external product circuitry through a separate anode current collector tab 702. The anode layer 202 may conduct electricity between electrochemically active regions of electrochemical cell 200 and the anode current collector tab 702. The anode current collector tab 702 may, for example, be located in a corner of the electrochemical cell 200. A region over which the anode current collector tab 702 is coupled with the anode layer 202 may not have a cathode subregion 204, and thus, may be thinner than a portion of the electrochemical cell 200 that includes a cathode subregion 204. More particularly, in an embodiment, the thinner corner may be formed by laser ablating or shadow masking the corner during formation of the cathode layer 304. Subsequently, the electrolyte layer 302 and the anode layer 202 may be deposited over the thinner corner. As a result, the anode current collector tab 702 may be an electrically conductive metal foil having a thickness equal to the thickness of the cathode subregions 204 without adding to an overall height of the electrochemical cell 200. Thus, incorporating an anode current collector tab 702 in a corner of the electrochemical cell 200 rather than placing an anode current collector 310 over the entire anode layer 202 may result in higher total energy densities of fully packaged electrochemical cells 200 and/or electrochemical devices incorporating electrochemical cells 200. Furthermore, the anode current collector tab 702 that is electrically connected to the anode layer 202 may be made thicker and more robust to improve the reliability of electrical connections to external circuitry.

Figure 8A:
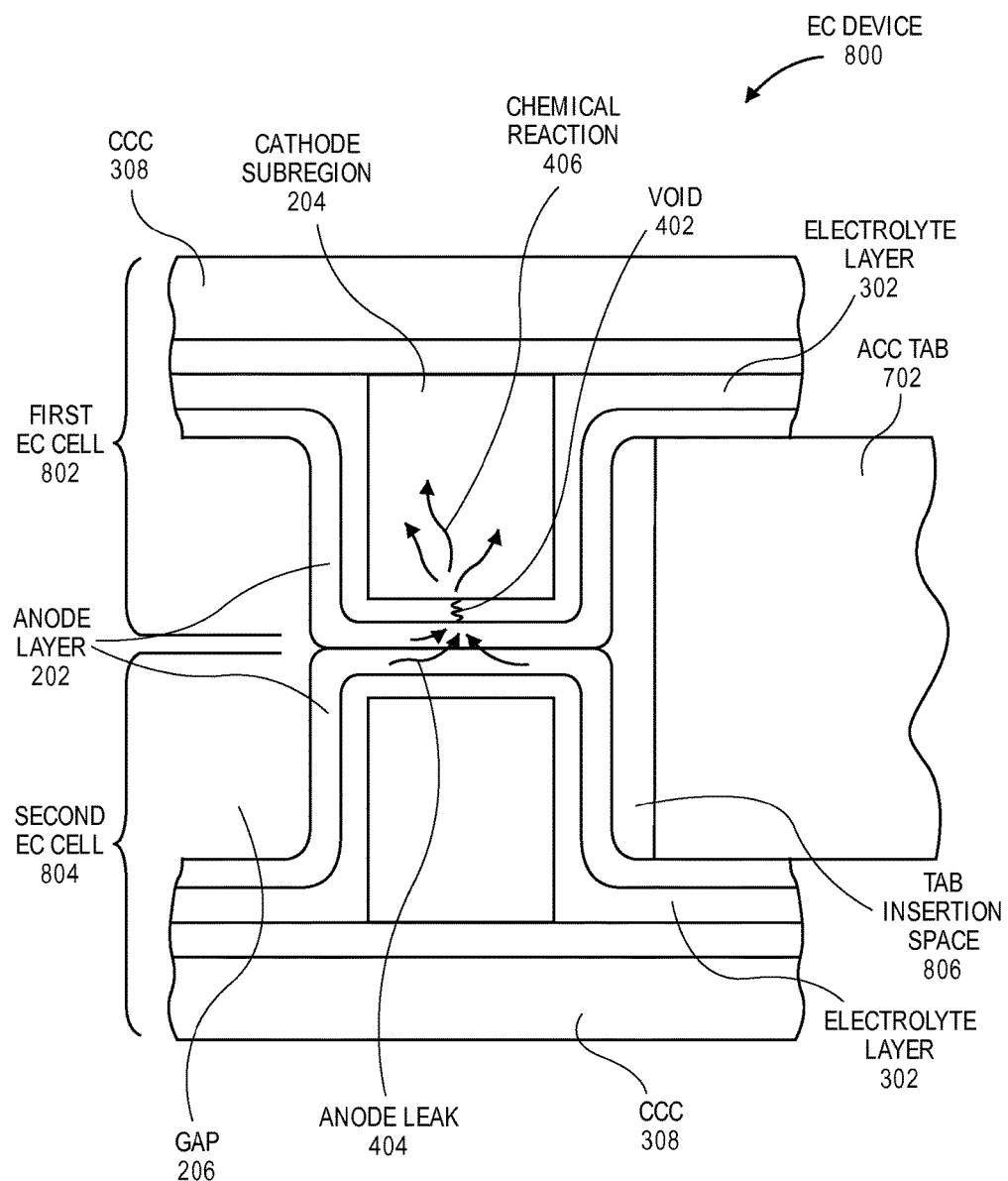
FIGS. 8A-8B are cross-sectional views of an electrochemical device having a defect in an electrolyte layer over a subdivided cathode layer in accordance with an embodiment.

Referring to FIG. 8A, a cross-sectional view of an electrochemical device having a defect in an electrolyte layer over a subdivided cathode layer is shown in accordance with an embodiment. In an embodiment, an electrochemical device 800 includes a first electrochemical cell 802 stacked on a second electrochemical cell 804 such that respective anode layers 202 of the electrochemical cells are adjacent to or in contact with one another. The respective anode layers 202 may have continuous layer structures, e.g., continuous sheet or film structures, that cover cathode subregions 204 and extend into the one or more gaps 206 between adjacent cathode subregions 204. Furthermore, as described above, a region of one or more of the stacked electrochemical cells, such as a corner region, may not include a cathode subregion. Thus, a tab insertion space 806 between respective anode layers 202 may allow for insertion of the anode current collector tab 702. The continuous layer structures of the anode layers 202 may separate the tab insertion space 806 from respective cathode current collectors 308 of the first electrochemical cell 802 and the second electrochemical cell 804. Thus, the anode current collector tab 702 may be sandwiched between the anode layers 202 and electrically connected to the anode layers 202 within the tab insertion space 806 without contacting cathode current collectors 308. Anode current collector tab 702 may be bonded to anode layers 202 using, e.g., conductive pressure sensitive adhesive. As described above, a defect such as the void 402 may occur in an electrolyte layer 302, allowing for an anode leak 404 of the anode layer 202 material into the cathode subregion 204.

Figure 8B:
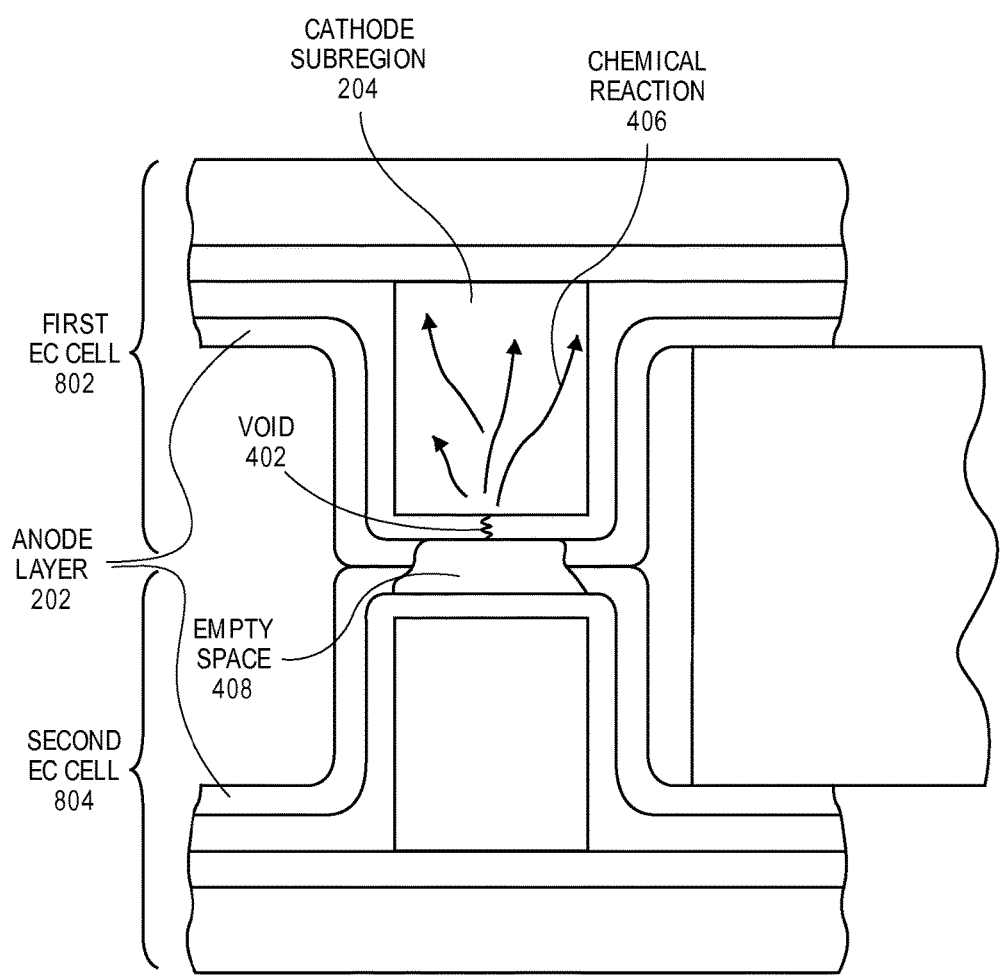

Referring to FIG. 8B, a cross-sectional view of an electrochemical device having a defect in an electrolyte layer over a subdivided cathode layer is shown in accordance with an embodiment. In an embodiment, since the respective anode layers 202 are in contact adjacent to the void 402, the anode leak 404 may include material from anode layers 202 of both the first electrochemical cell 802 and the second electrochemical cell 804 propagating through the void 402 to the affected cathode subregion 204. As described above in relation to an electrochemical cell 200, the chemical reaction 406 in the cathode subregion 204 may persist until the empty space 408 is formed over the void 402. That is, the anode leak may stop after the anode material between electrolyte layers of the electrochemical cells is drained. Accordingly, the electrochemical device 800 having stacked electrochemical cells with subdivided cathode layers may limit defects to individual cathode subregions 204 that become physically and electrically isolated from other portions of the electrochemical device 800. As such, a defective area may have little impact on the device performance, e.g., capacity, energy, power, resistance, cycle life, and yields and overall performance of the electrochemical device 800 may be improved.

Figure 9:
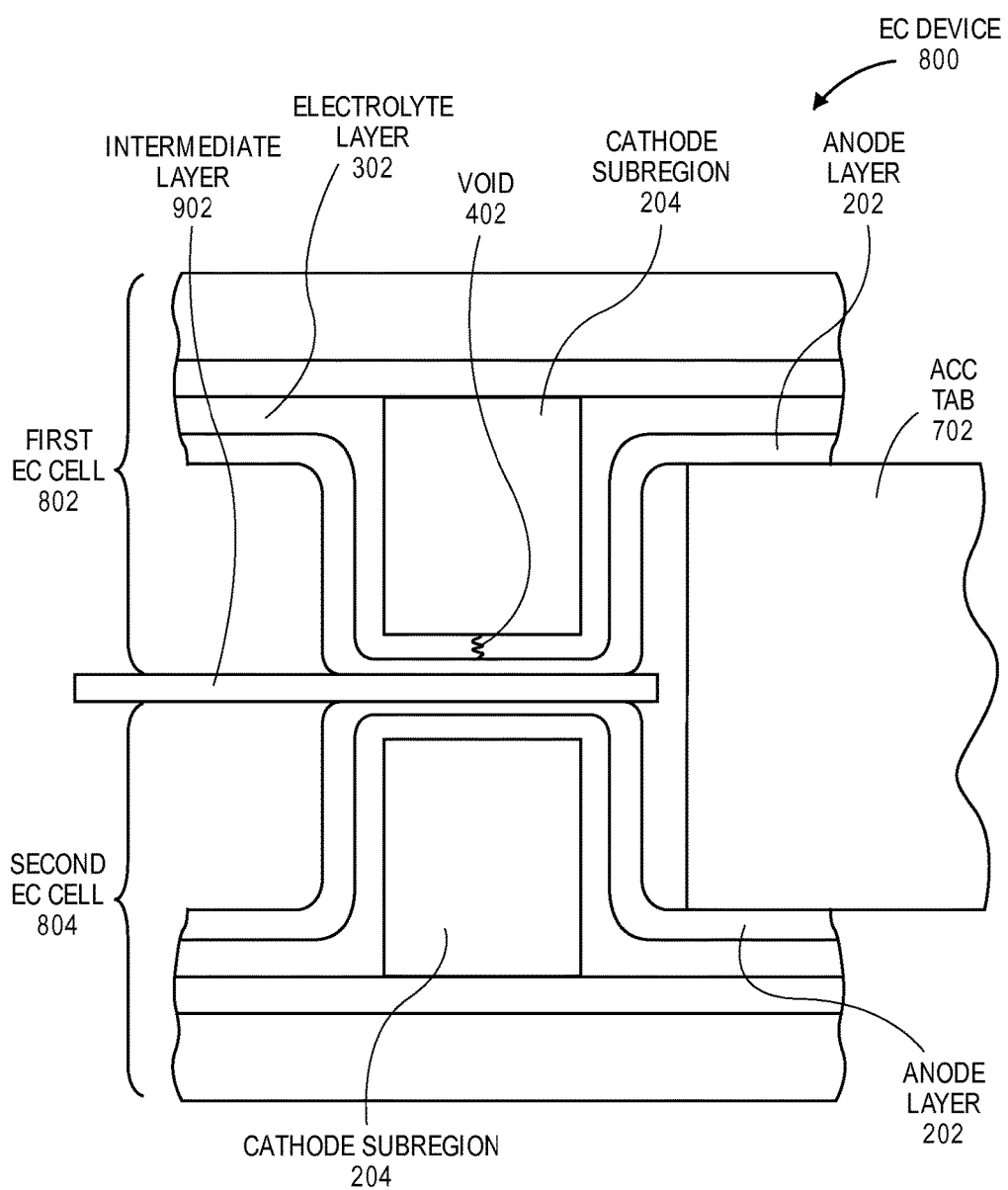
FIG. 9 is a cross-sectional view of an electrochemical device having an intermediate layer between subdivided cathode layers in accordance with an embodiment.

Referring to FIG. 9, a cross-sectional view of an electrochemical device having an intermediate layer between subdivided cathode layers is shown in accordance with an embodiment. In an embodiment, the propagation of anode layer 202 material when a void 402 occurs may be limited further by incorporating an intermediate layer 902 between respective anode layers 202 of the stacked electrochemical cells in the electrochemical device 800. For example, the intermediate layer 902 may include an electrically conductive anode current collector between the anode layers 202 that electrically connects the cathode subregions 204 of the electrochemical device 800, but reduces the likelihood of anode layer 202 material of a second electrochemical cell 804 from propagating through a void 402 in an electrolyte layer 302 of the first electrochemical cell 802. Thus, when the void 402 forms, anode layer 202 material from the first electrochemical cell 802 may propagate through the void 402 to cause chemical reactions in the cathode subregion 204 until an empty space is formed between the intermediate layer 902 and the void 402, thereby creating an open circuit and isolating the cathode subregion 204 from the remainder of the electrochemical device 800. Although the anode current collector tab 702 is illustrated in FIG. 9, in an embodiment, intermediate layer 902 may be an anode current collector 310 that extends outside and away from electrochemical device 800 for connection with external product circuitry. Thus, the anode current collector tab 702 may be omitted in an embodiment in which it is a redundant with the intermediate layer 902.

In an alternative embodiment, the intermediate layer 902 may include an insulating layer between the anode layers 202 of the stacked electrochemical cells. For example, the insulating layer 902 may be a thin film of insulating material that is inert to lithium. Examples of such material include pressure sensitive adhesives, such as acrylics, as well as other insulating materials such as polyimide, etc. The insulating layer may be one or both of electrically insulating or ionically insulating, and may be made from materials having either of those properties.

Figure 10:
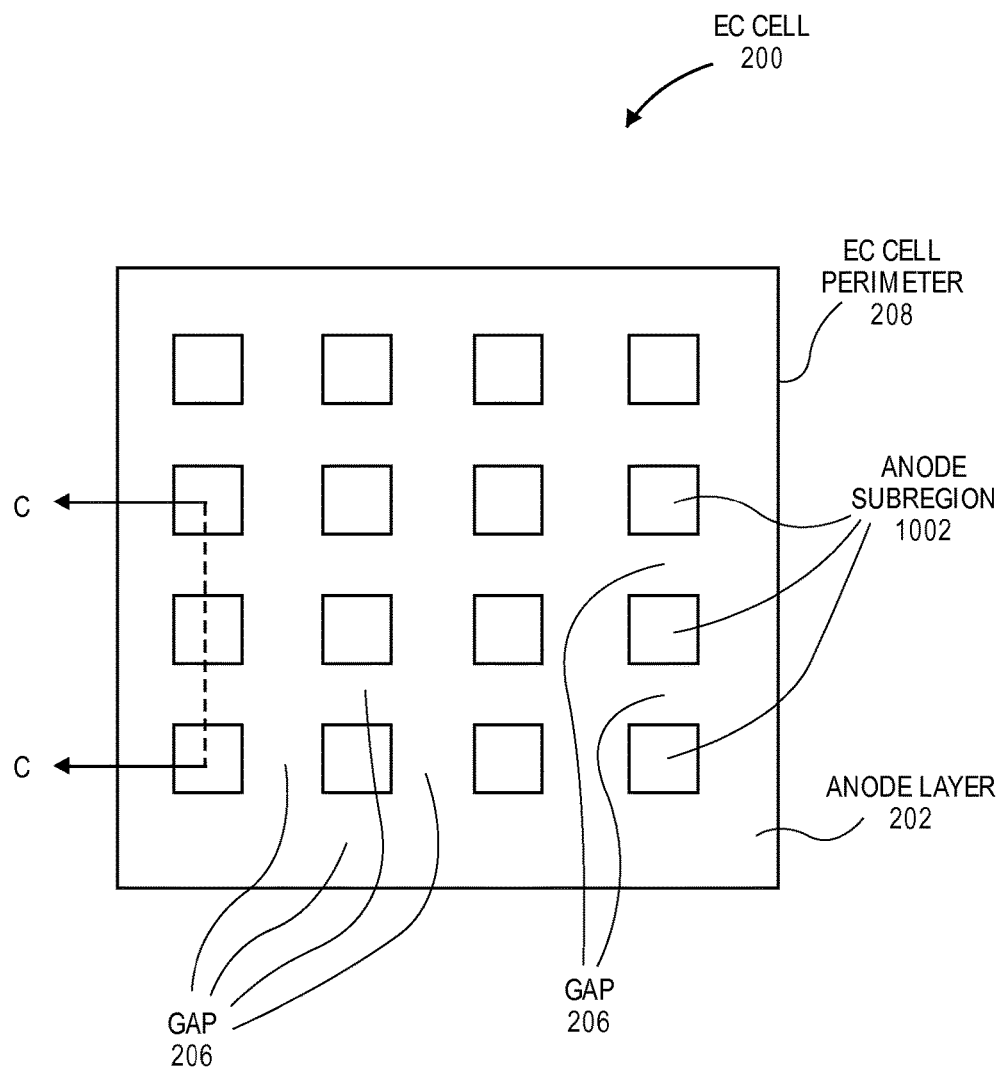
FIG. 10 is a plan view of an electrochemical cell having a subdivided anode layer in accordance with an embodiment.

Referring to FIG. 10, a plan view of an electrochemical cell having a subdivided anode layer is shown in accordance with an embodiment. An electrochemical cell 200 may include an anode layer 202 over a cathode layer. Furthermore, the anode layer 202 may be subdivided into one or more anode subregions 1002 spaced across the electrochemical cell 200 above the cathode layer and the electrolyte layer. More particularly, the anode subregions 1002 may be separated from each other by one or more gaps 206. For example, one or more gaps 206 may surround each anode subregion 1002 to physically isolate the anode subregion 1002 from neighboring anode subregions 1002.

In an embodiment, the anode layer 202 may include a grid pattern, in which each anode subregion 1002 includes a rectangular surface area and is separated from adjacent anode subregions 1002 by one or more linear gaps 206 traversing the electrochemical cell 200. After anode layer material is deposited over the electrolyte layer, laser scribing may be used to remove the anode layer material to form one or more gaps 206 between anode subregions 1002. Alternatively, shadow masking may be used to form anode subregions 1002 separated by masked regions that become the unfilled gaps 206. However, other anode layer 202 patterns may be used. For example, the one or more gaps 206 may be laser scribed in any shape to form anode subregions 1002 that are, e.g., polygonal, conic sections, elliptical, etc. The remaining anode material of the anode subregions 1002 essentially form islands of a patterned anode layer 202. Anode subregions 1002 may have a same or different shape as compared to other anode subregions 1002 in the anode layer 202.

Regardless of the shape of the anode subregions 1002, the anode layer 202 may include a total projected surface area when viewed from above within an electrochemical cell perimeter 208 that includes a combined projected surface area of each anode subregion 1002 and a combined projected surface area of the one or more gaps 206 between the anode subregions 1002. For example, each anode subregion 1002 may have a projected area of a square profile with equal sides and each gap 206 may have equal widths. Thus, a total projected surface area of the anode layer 202 within an electrochemical cell perimeter 208 may include all of the projected square anode subregion surface areas as well as the projected surface area within the uniform gaps 206. In an embodiment, a patterned anode area utilization, i.e., a ratio of the combined individual anode subregion surface areas to the total surface area of the anode layer 202, may be less than 30%. For example, the patterned anode area utilization may be less than 25%. In an embodiment, a grid pattern has square anode subregions 1002 with sides of 10 micron separated by one or more 10 micron gaps 206. Thus, the patterned anode area utilization may be expected to be 25%. Widening the one or more gaps 206 or shrinking the anode subregions 1002 can decrease the patterned anode area utilization.

Figure 11:
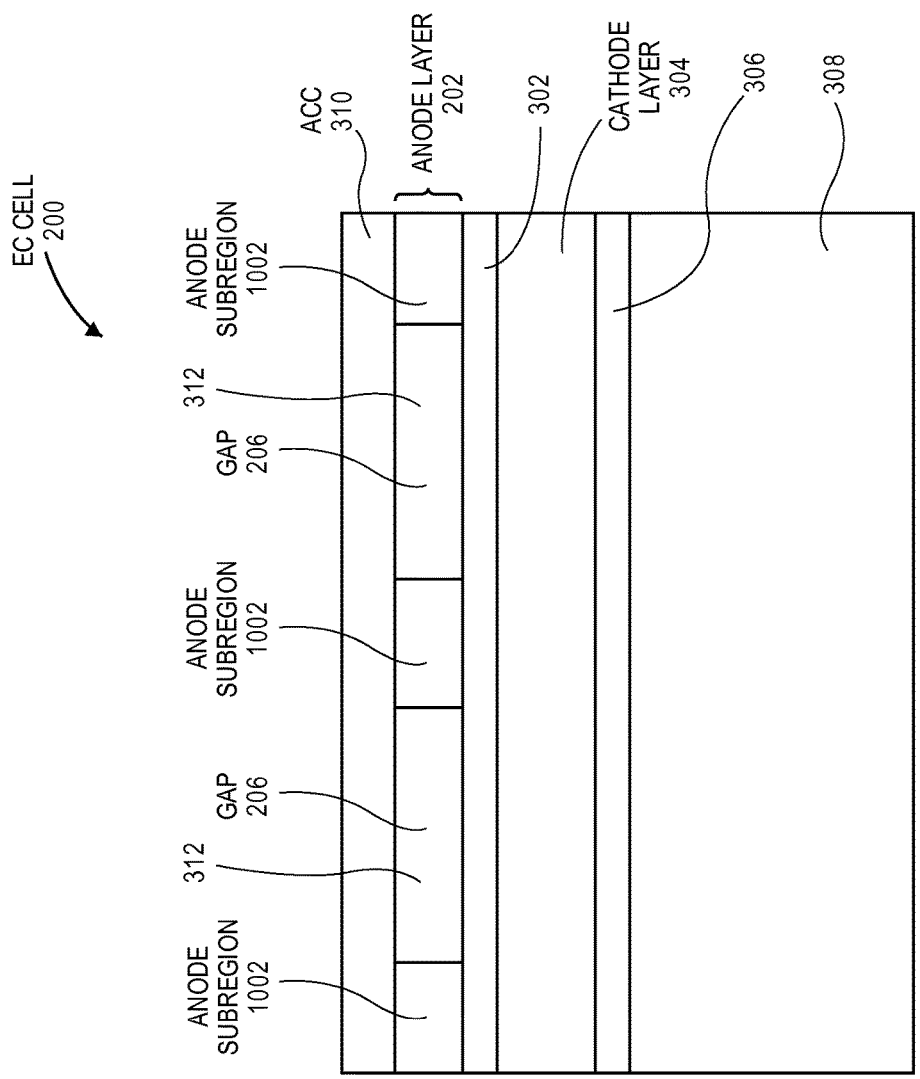
FIG. 11 is a cross-sectional view, taken about line C-C of FIG. 10, of an electrochemical cell having a subdivided anode layer in accordance with an embodiment.

Referring to FIG. 11, a cross-sectional view, taken about line C-C of FIG. 10, of an electrochemical cell having a subdivided anode layer is shown in accordance with an embodiment. In an embodiment, the electrochemical cell 200 may include the electrolyte layer 302 between the anode layer 202, having anode subregions 1002 and one or more gaps 206, and the cathode layer 304. As described above, the one or more gaps 206 in the anode layer 202 may define a space between the portions of the anode layer 202 that contain anode material such as lithium, i.e., a space between anode subregions 1002. Gaps 206 may be formed by removing anode material and optionally a thin layer of electrolyte material using, e.g., a laser ablation process. Thus, the anode subregions 1002 may be fully separated by intervening gaps 206. In an embodiment, the gaps 206 between the anode subregions 1002 of the anode layer 202 are filled entirely by a single dielectric 312, e.g., a dielectric gas such as an inert gas, or a vacuum. Furthermore, the barrier film layer 306 may be between the cathode layer 304 and the cathode current collector 308. In an embodiment, the electrochemical cell 200 may include the electrically conductive anode current collector 310 placed in electrical contact with the anode layer 202. The anode current collector 310 may include a metal foil that makes mechanical and electrical contact with all of the anode subregions 1002 of the anode layer 202. In an embodiment, the various layers of electrochemical cell 200 may include materials and dimensions similar to those described above with respect to the electrochemical cell 200 having a patterned cathode layer 304.

Figure 12:
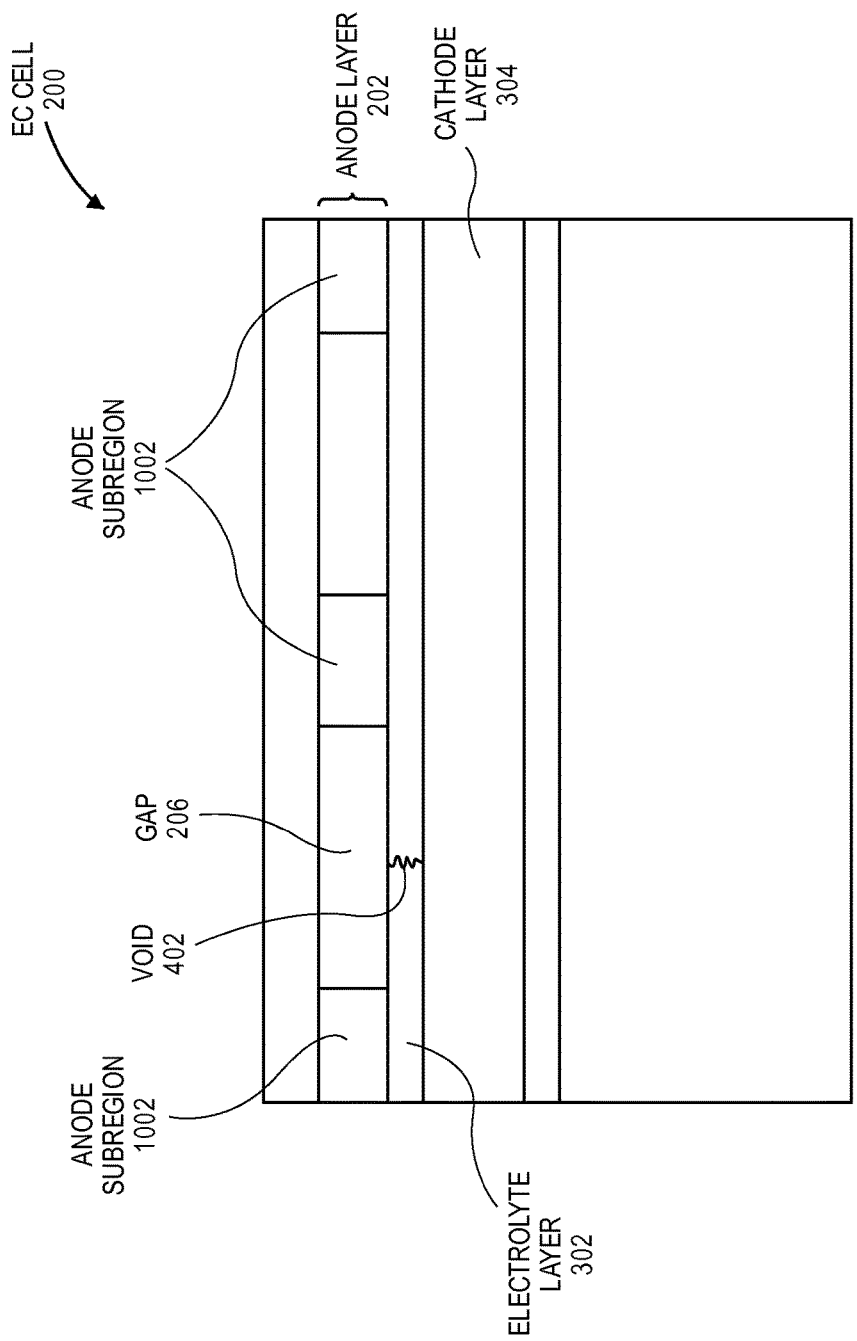
FIG. 12 is a cross-sectional view, taken about line C-C of FIG. 10, of an electrochemical cell having a defect in an electrolyte layer under a subdivided anode layer in accordance with an embodiment.

Referring to FIG. 12, a cross-sectional view, taken about line C-C of FIG. 10, of an electrochemical cell having a defect in an electrolyte layer under a subdivided anode layer is shown in accordance with an embodiment. In an embodiment, the electrolyte layer 302 may include a defect, such as a void 402. As described above, the void 402 can introduce a path for an electrical leak between the anode layer 202 and the cathode layer 304. However, as compared to an electrochemical cell 200 having a uniform, i.e., non-patterned anode layer 202 across electrochemical cell 200, the electrochemical cell 200 having anode subregions 1002 occupying only a fraction of the total projected surface area of the anode layer is less likely to have the void 402 aligned with an anode subregion 1002. More particularly, the void 402 may be three times more likely to be aligned with the one or more gaps 206 when the combined projected surface areas of the anode subregions 1002 is only 25% of a total projected surface of the anode layer 202. Thus, as a result of the patterned anode layer 202, the likelihood of battery failure via internal short circuit between the anode subregions 1002 and the cathode layer 304 may be reduced in proportion to the patterned anode area utilization.

Figure 13A:
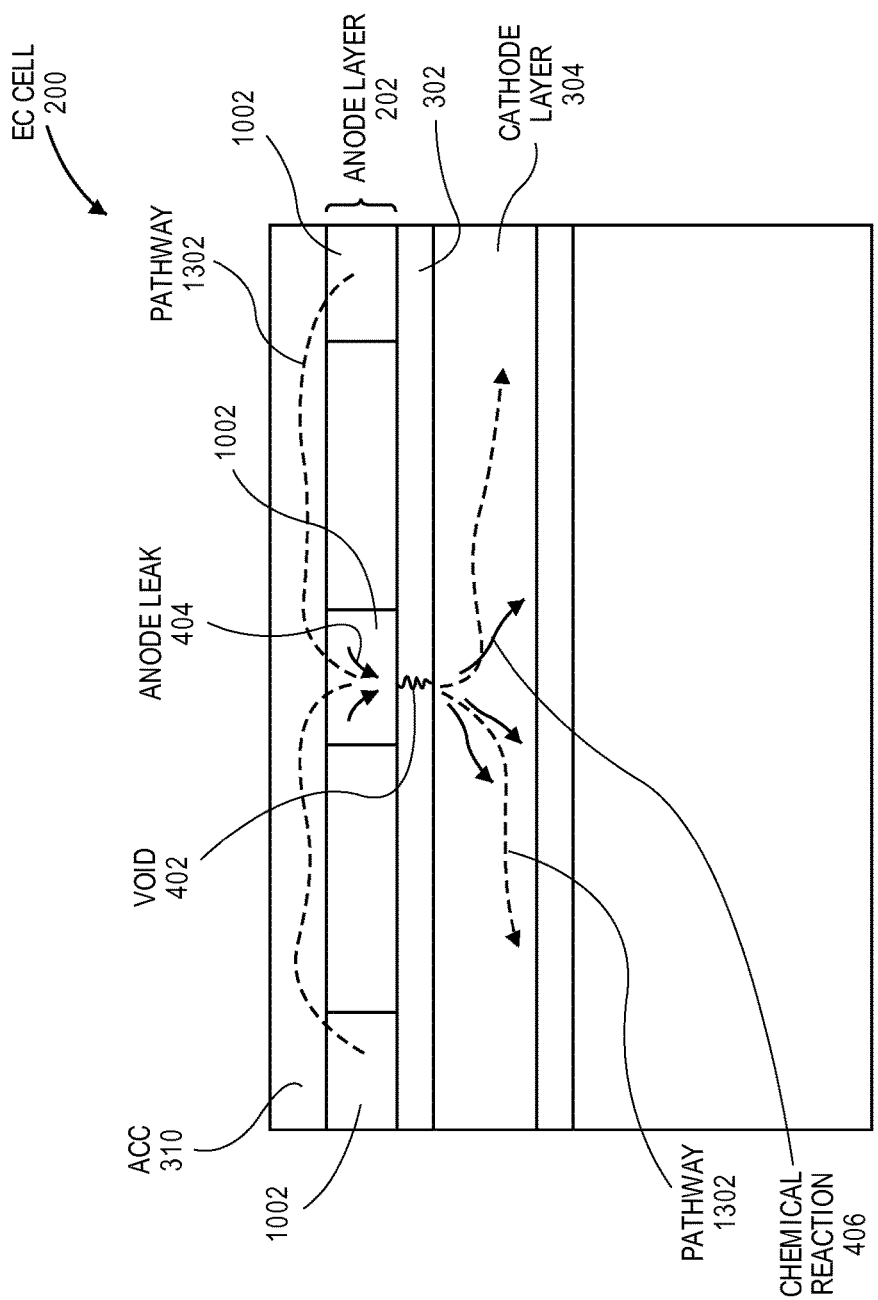
FIGS. 13A-13B are cross-sectional views, taken about line C-C of FIG. 10, of an electrochemical cell having a defect in an electrolyte layer under a subdivided anode layer in accordance with an embodiment.

Referring to FIG. 13A, a cross-sectional view, taken about line C-C of FIG. 10, of an electrochemical cell having a defect in an electrolyte layer under a subdivided anode layer is shown in accordance with an embodiment. In an embodiment, the void 402 may occur in the electrolyte layer 302 between an anode subregion 1002 and the underlying cathode layer 304. Thus, the void 402 can introduce a path for an electrical leak between the anode layer 202 and the cathode layer 304. That is, an anode leak 404 may occur as the anode layer material creeps into the cathode layer 304 through the void 402. As the anode material interacts with the cathode material, chemical reactions 406 may propagate through the cathode layer 304 to create unwanted chemical products. Furthermore, electron discharge from neighboring anode subregions 1002 may follow a pathway 1302 through the anode current collector 310 into the anode subregion 1002 adjacent to the void 402, and then onward through the void 402 into the cathode layer 304. Accordingly, the void 402 may result in self-discharge of the anode layer 202 that could eventually discharge the entire electrochemical cell 200.

Figure 13B:
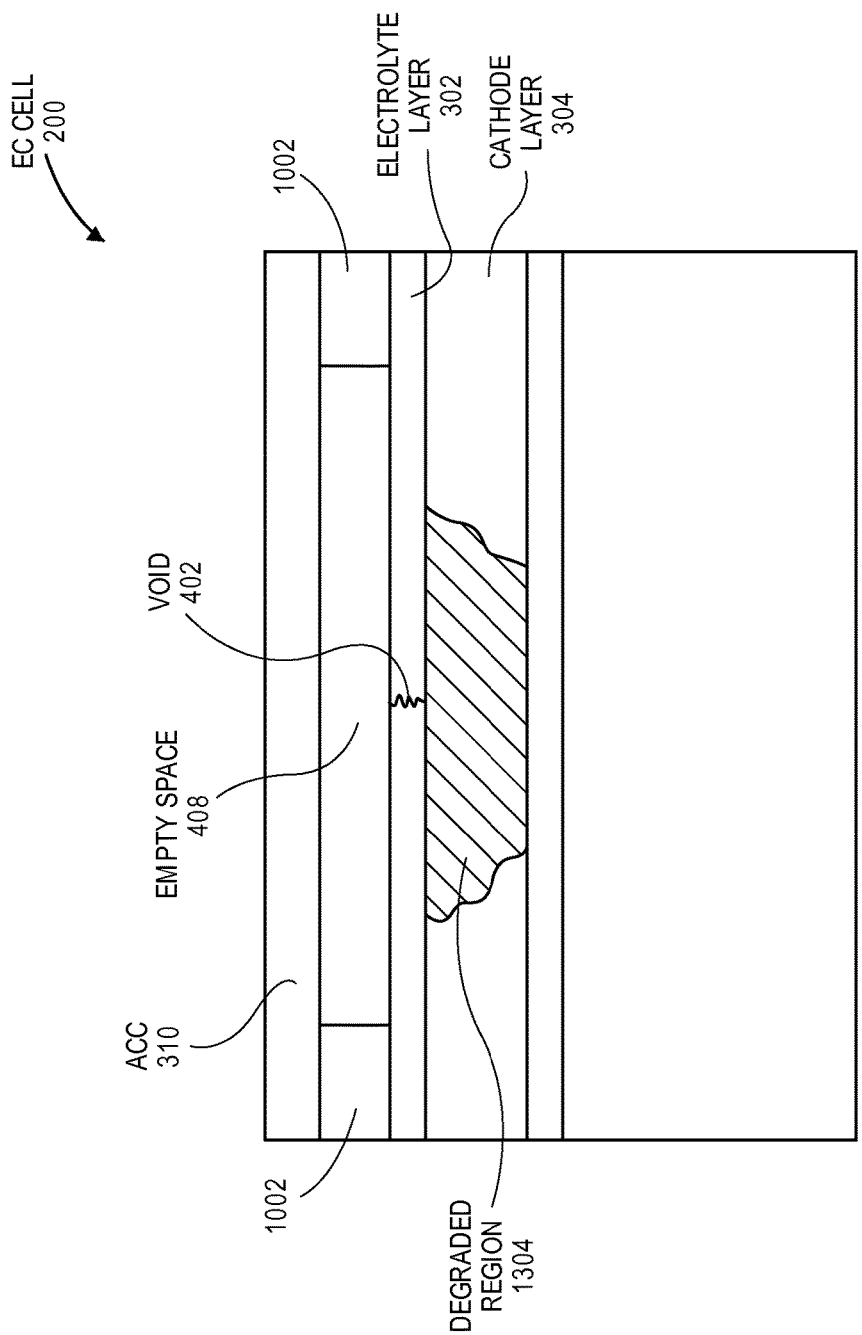

Referring to FIG. 13B, a cross-sectional view, taken about line C-C of FIG. 10, of an electrochemical cell having a defect in an electrolyte layer under a subdivided anode layer is shown in accordance with an embodiment. As the anode leak persists, chemical reactions in the cathode layer 304 may continue and be accompanied by concomitant disappearance of the anode subregion 1002 adjacent to the void 402. That is, anode layer material may physically leak through the void 402 until there is no longer anode material above void 402. Accordingly, an empty space 408 may be created above the void 402, e.g., between the electrolyte layer 302 and the anode current collector 310. The empty space 408 may create an electrical open circuit between the electrolyte layer 302 and the anode current collector 310. Thus, the anode leak may eventually cease, and the chemical reaction and electrical leakage in the cathode layer 304 may stop. In an embodiment, the anode leak may result in a degraded region 1304 of the cathode layer 304, but a larger healthy region of the cathode layer 304 may be unaffected by the anode leak. Thus, a patterned anode layer may mitigate the impact of an electrolyte layer defect on overall performance of the electrochemical cell 200.

Figure 14:
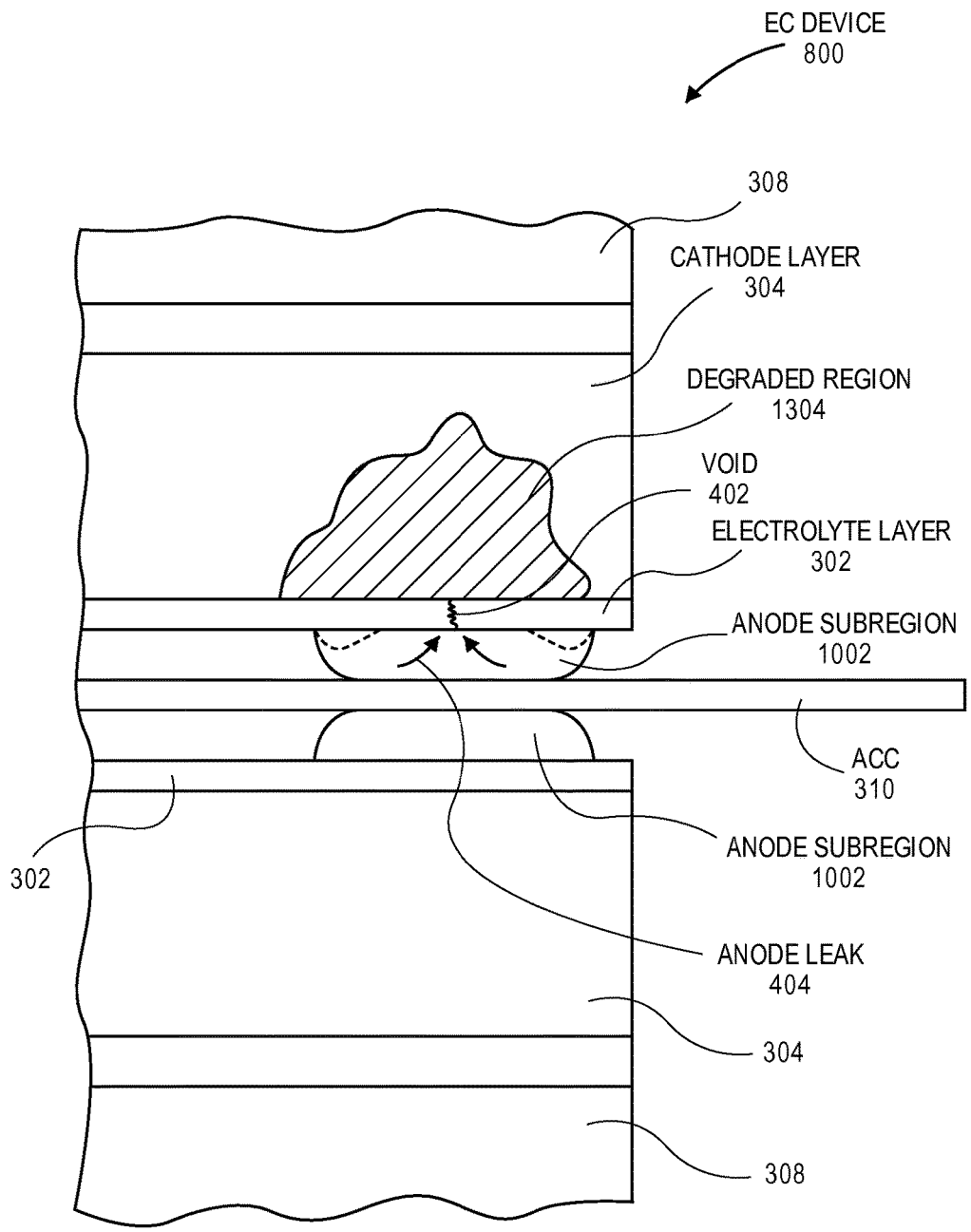
FIG. 14 is a side view of an electrochemical device having an anode current collector between subdivided anode layers in accordance with an embodiment.

Referring to FIG. 14, a side view of an electrochemical device having an anode current collector between subdivided anode layers is shown in accordance with an embodiment. In an embodiment, an electrochemical device 800 may be formed from several electrochemical cells 200 having patterned anode layers as described with respect to FIG. 10. More particularly, several electrochemical cells 200 may be stacked with respective anode subregions 1002 facing one another. Some of the anode subregions 1002 in the anode layers may be directly across from the anode current collector 310 from one another, i.e., may appear overlapping when viewed from above (i.e., when viewed vertically downward along the plane of the drawing sheet). The anode current collector 310 may have a continuous layer structure, e.g., a continuous sheet or film structure. Thus, the anode subregions 1002 of respective stacked electrochemical cells 200 may be electrically connected to each other through the continuous layer structure of the anode current collector 310. That is, the anode subregions 1002 of a first electrochemical cell 200 of electrochemical device 800 may be electrically connected with each other, as well as electrically connected with anode subregions 1002 of a second electrochemical cell 200 of electrochemical device 800, through the continuous layer structure of the anode current collector 310. Furthermore, the anode current collector 310 having a continuous layer structure may be between respective cathode layers 304 of the stacked electrochemical cells 200 of electrochemical device 800, thereby physically separating the electrochemical cells 200.

In an embodiment, one or more of the stacked electrochemical cells 200 forming electrochemical device 800 may include a cathode current collector 308 electrically connected to a cathode layer 304. For example, a first cathode current collector 308 may be electrically connected to a cathode layer 304 of a first electrochemical cell 200 of electrochemical device 800 and a second cathode current collector 308 may be electrically connected to a cathode layer 304 of a second electrochemical cell 200 of electrochemical device 800. Both the cathode layer 304 and the cathode current collector 308 may have continuous layer structures, e.g., continuous sheet or film structures.

In an embodiment, the electrochemical device 800 may include a void 402 in one of the electrolyte layers 302 that causes an anode leak 404 to reduce the size of a respective anode subregion 1002 adjacent to the void 402. Accordingly, the anode subregion 1002 will eventually shrink to fill space laterally away from void 402 (not under void 402), as indicated by the dotted lines in FIG. 14, to result in an empty space between the void 402 and the anode current collector 310. Thus, the degraded region 1304 of the underlying cathode layer 304 may be limited by the size of the anode subregion 1002 adjacent to the void 402. As such, an electrochemical device having patterned anode layers may limit the impact that an electrolyte void has on overall performance of the device.

Figure 15:
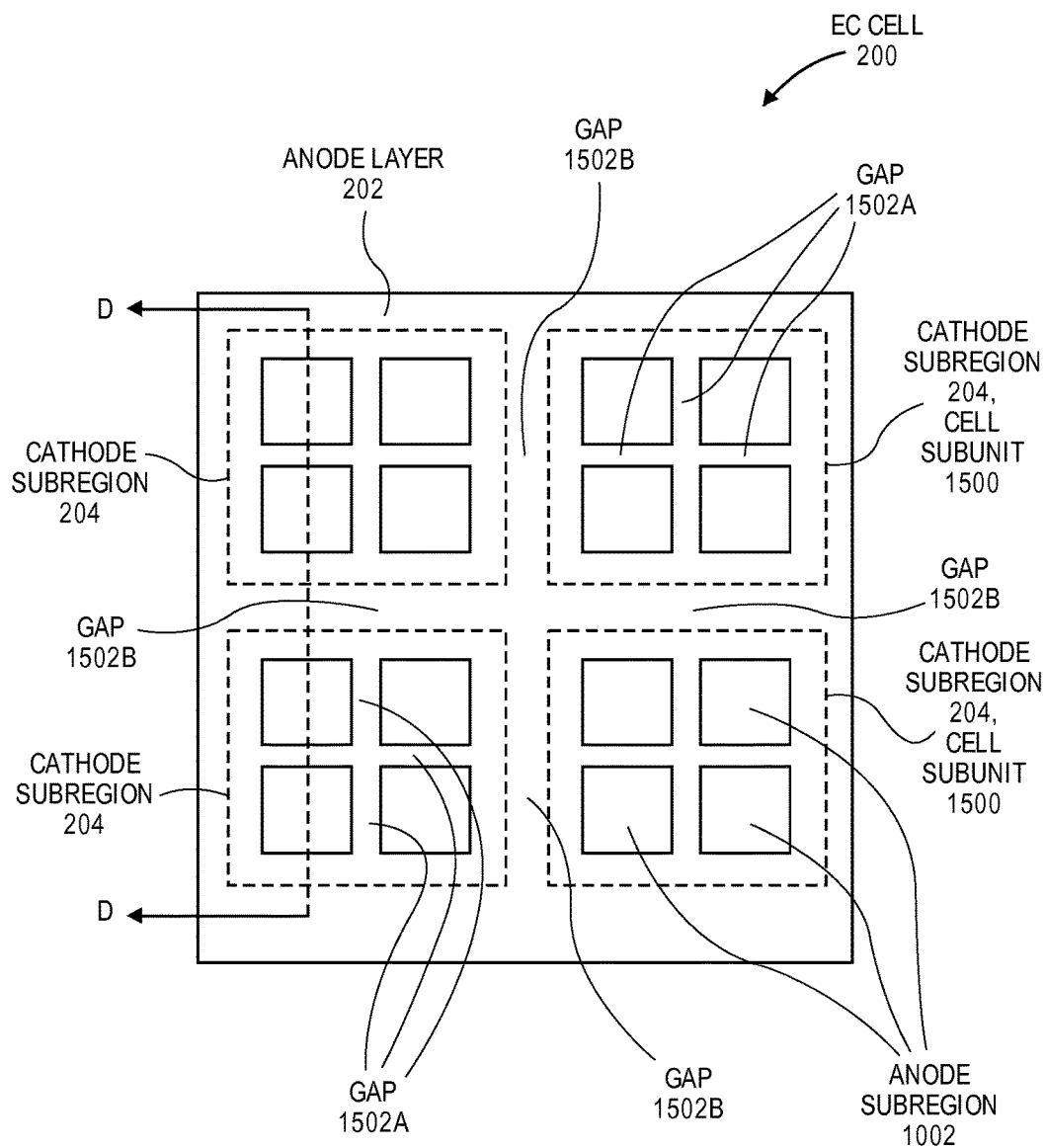
FIG. 15 is a plan view of an electrochemical cell having a subdivided anode layer over a subdivided cathode layer in accordance with an embodiment.

Referring to FIG. 15, a plan view of an electrochemical cell having a subdivided anode layer over a subdivided cathode layer is shown in accordance with an embodiment. In an embodiment, electrochemical cell 200 may be subdivided into several cell subunits 1500, and each cell subunit may include at least two anode subregions 1002 disposed over a cathode subregion 204. That is, the anode layer 202 may be subdivided into one or more anode subregions 1002 spaced across the electrochemical cell 200 above a cathode layer 304 that is also subdivided into one or more cathode subregions 204. For example, as shown in FIG. 15, each cathode subregion 204 may provide a base to support four anode subregions 1002, although this is illustrated by way of example and not limitation. More particularly, the cathode layer 304 may be patterned to include at least two cathode subregions 204, and two or more of the anode subregions 1002 may be disposed over one of the cathode subregions 204 represented with hidden lines. In each of the cathode layer 304 and the anode layer 202, one or more gaps may surround each patterned island. For example, one or more gaps 1502A may separate anode subregions 1002 from neighboring anode subregions 1002, and one or more gaps 1502B may separate cathode subregions 602 from a neighboring cathode subregions 602. Accordingly, the gaps 1502B may also extend into the page between cell subunits 1500 to separate the cell subunits. As described above, the gaps 1502A and 1502B may be at least partially filled by a dielectric 312, e.g., a dielectric gas.

Figure 16:
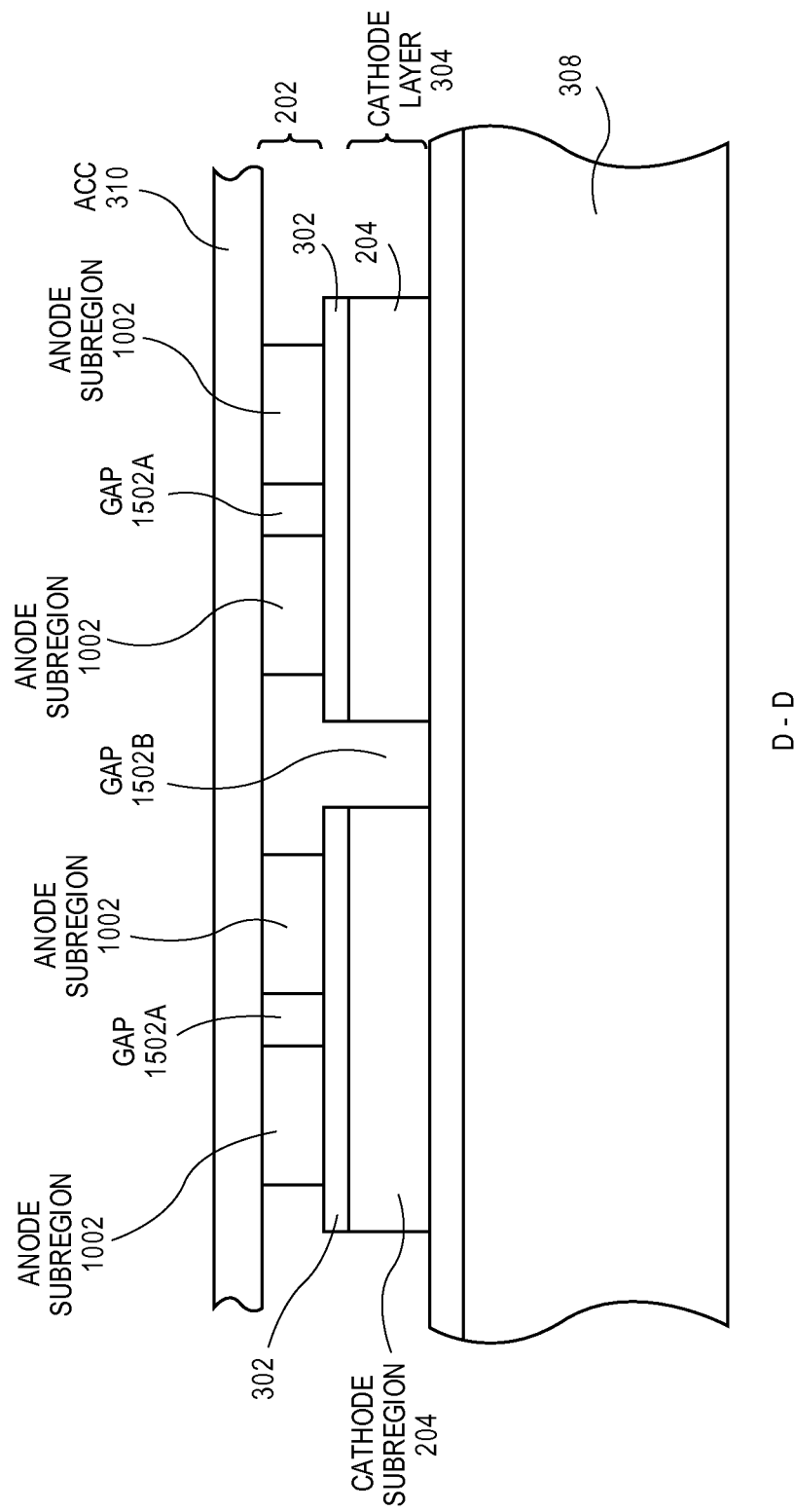
FIG. 16 is a cross-sectional view, taken about line D-D of FIG. 15, of an electrochemical cell having a subdivided anode layer over a subdivided cathode layer in accordance with an embodiment.

Referring to FIG. 16, a cross-sectional view, taken about line D-D of FIG. 15, of an electrochemical cell having a subdivided anode layer over a subdivided cathode layer is shown in accordance with an embodiment. In an embodiment, the electrochemical cell 200 may include the electrolyte layer 302 between the anode layer 202, having anode subregions 1002 and one or more gaps 1502A, and the cathode layer 304, having cathode subregions 204 and one or more gaps 1502B. As described above, the one or more gaps 1502A in the anode layer 202 may define a space between the anode subregions 1002. Anode subregions 1002 may contain anode material such as lithium. In an embodiment, the one or more gaps 1502A are filled entirely by a single dielectric 312, e.g., a dielectric gas such as an inert gas, or a vacuum. Also as described above, the one or more gaps 1502B in the cathode layer 304 may define a space between the cathode subregions 204 (and also separate anode subregions 1002 located on adjacent cathode subregions 204). The cathode subregions may contain cathode material. In an embodiment, the one or more gaps 1502B are filled entirely by a single dielectric 312, e.g., a dielectric gas such as an inert gas, or a vacuum. In an embodiment, the electrochemical cell 200 may include the electrically conductive anode current collector 310 placed in electrical contact with anode subregions 1002. The anode current collector 310 may include a metal foil that makes mechanical and electrical contact with all of the anode subregions 1002 in the electrochemical cell 200. Furthermore, the electrochemical cell 200 may include an electrically conductive cathode current collector 308 placed in electrical connection with the cathode subregions 204. That is, the cathode subregions 204 may electrically connect to a common, or shared, cathode current collector 308. The various layers of electrochemical cell 200 may include materials and dimensions similar to those described above.

In an embodiment, the anode layer 202 and the cathode layer 304 may each include a grid pattern, as described above. In an embodiment, the anode layer 202, the cathode layer 304, and the electrolyte layer 302 may be formed over, e.g., cathode current collector 310, in uniform layers. The layers may then be selectively laser scribed to create one or more gaps 1502B separating cathode subregions 204 (and also separating anode subregions 1002 located on adjacent cathode subregions 204) and one or more gaps 1502A separating anode subregions 1002 on top of one or more of cathode subregions 204. More particularly, laser scribing may remove material to create essentially a set of cathode islands with a set of anode islands over one of the cathode islands. Other methods, including shadow masking may be used to form the structure shown in FIG. 16.

Figure 17:
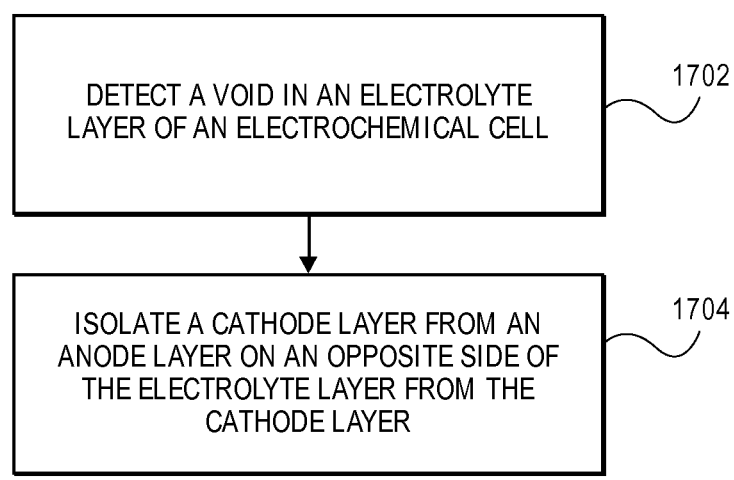
FIG. 17 is a flowchart illustrating a method for isolating a cathode layer from an anode leak in accordance with an embodiment.

Referring to FIG. 17, a flowchart illustrating a method for isolating a cathode layer from an anode leak is shown in accordance with an embodiment. At operation 1702, during production of an electrochemical cell 200 or assembly of an electrochemical device 800, such as a solid-state battery, a void 402 in an electrolyte layer 302 may be detected. Detection of the void 402 may occur at various times during the manufacturing process, including before or after deposition of the anode layer 202 over the electrolyte layer 302. At operation 1704, once the void 402 is detected, various operations may be employed to ensure that the cathode layer 304 in a finished electrochemical cell 200 will be isolated from the anode layer 202 across the electrolyte layer 302. For example, the void 402 may be filled or the anode layer material may be removed from over the void 402 to reduce the likelihood of an anode leak 404. Embodiments of methods for detecting a void 402 and isolating the cathode layer 304 will be described further below.

Figure 18:
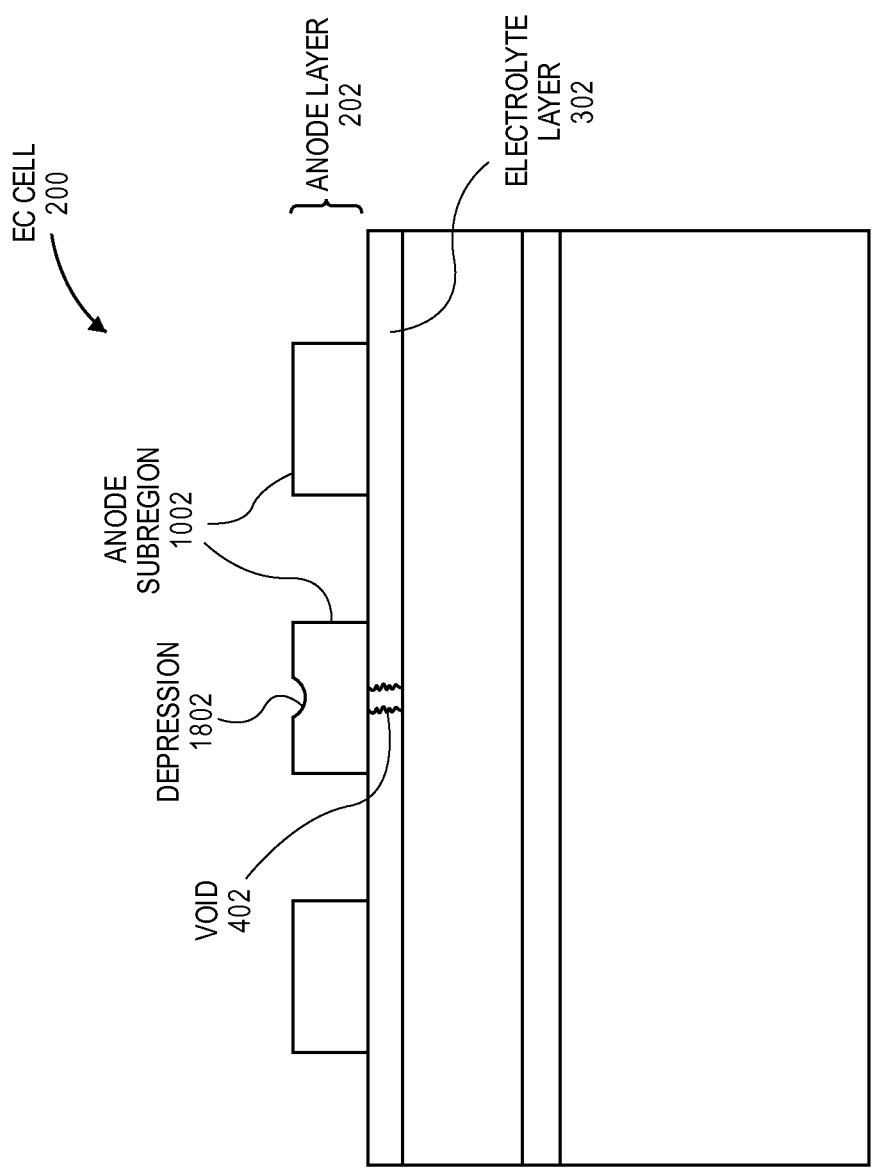
FIG. 18 is a side view of an electrochemical cell during a defect detection operation in accordance with an embodiment.

Referring to FIG. 18, a side view of an electrochemical cell during a defect detection operation is shown in accordance with an embodiment. Detection of the void 402 at operation 1702 may include detection performed by optical, electrical, thermal, and other testing methods that are known for finding material voids. For example, an electrochemical cell 200 may be viewed under microscopy to detect the void 402. In an embodiment, the void 402 in electrolyte layer 302 causes a depression 1802 in an anode subregion 1002 of the anode layer 202, as the anode layer material creeps into the void 402. The depression 1802 may be visible as a discoloration or as a defective topology, such as a sinkhole on a top surface of an anode subregion 1002. Thus, the void 402 may be identified by optical methods.

In an embodiment, the void 402 may be detected with electrical methods. For example, the anode layer 202 may include several anode subregions 1002 over a top surface of the electrochemical cell 200. Depending on the integrity of the electrolyte layer 302 beneath the anode subregions 1002, the voltage at the anode subregions 1002 may vary. For example, a voltage probe may be placed on the rightmost anode subregion 1002 shown in FIG. 18 to measure a first voltage measurement and the center anode subregion 1002 may be probed to measure a second voltage measurement. In an embodiment, given that the void 402 may create an electrical short between the center anode subregion 1002 and the cathode layer 304, the first voltage measurement may be markedly higher than the second voltage measurement. It may therefore be inferred through voltage readings of a patterned anode layer which anode subregions 1002 are adjacent to voids 402. Thus, in addition to increasing yield and mitigating the impact of defects on cell performance, an electrochemical cell 200 having a patterned anode layer 202 may also facilitate identification of defects during manufacturing, so that they may be dealt with prior to product packaging. This may increase yields and product performance even further.

Additional methods of detecting voids 402 may be used. For example, electrical methods of detection may also include measuring current flow or resistivity across the electrochemical cell 200 to infer a void 402 location. Thermal methods of detection include monitoring surface temperatures of electrochemical cell 200 while applying a current to infer void 402 locations through the identification of localized hot spots. Other methods include electromagnetic wave deflection, absorption, reflection, raman scattering, etc., that can be used to detect pinholes in materials, i.e., the void 402 in electrolyte layer 302. Depending upon the stage of manufacturing at which the void 402 is detected, various methods may be used to mitigate the impact of the void 402 by isolating the cathode layer 304 under the void 402. In particular, modifications may be made to ensure that in the final electrochemical cell 200 assembly, the cathode layer 304 under the void 402 is either not in electrical communication with the anode layer 202, or is isolated from surrounding cathode layer 304 areas to mitigate the impact that an anode leak 404 may have on electrochemical cell function.

Figure 19:
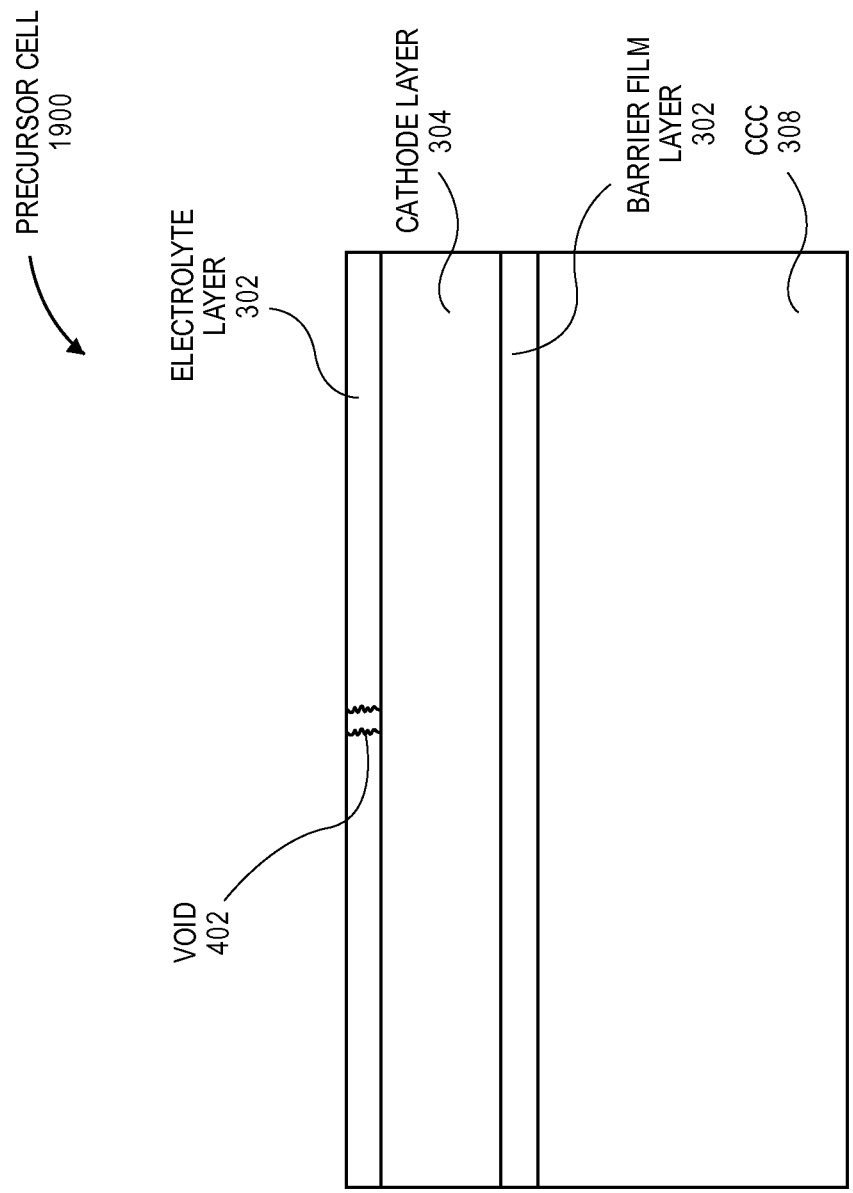
FIG. 19 is a side view of a precursor cell having a defect in an electrolyte layer in accordance with an embodiment.

Referring to FIG. 19, a side view of a precursor cell having a defect in an electrolyte layer is shown in accordance with an embodiment. A precursor cell 1900 may include the electrolyte layer 302, the cathode layer 304, the barrier film layer 306, and the cathode current collector 308. Thus, in an embodiment, the precursor cell 1900 represents a state of manufacturing prior to deposition of the anode layer 202 over the electrolyte layer 302. At this stage, a void 402 may be detected in the electrolyte layer 302 using any of the methods described above, or other detection methods. Accordingly, a repair technique may be employed that will reduce the likelihood of an anode leak 404 through the void 402 after the anode layer 202 is deposited over the electrolyte layer 302.

Figure 20:
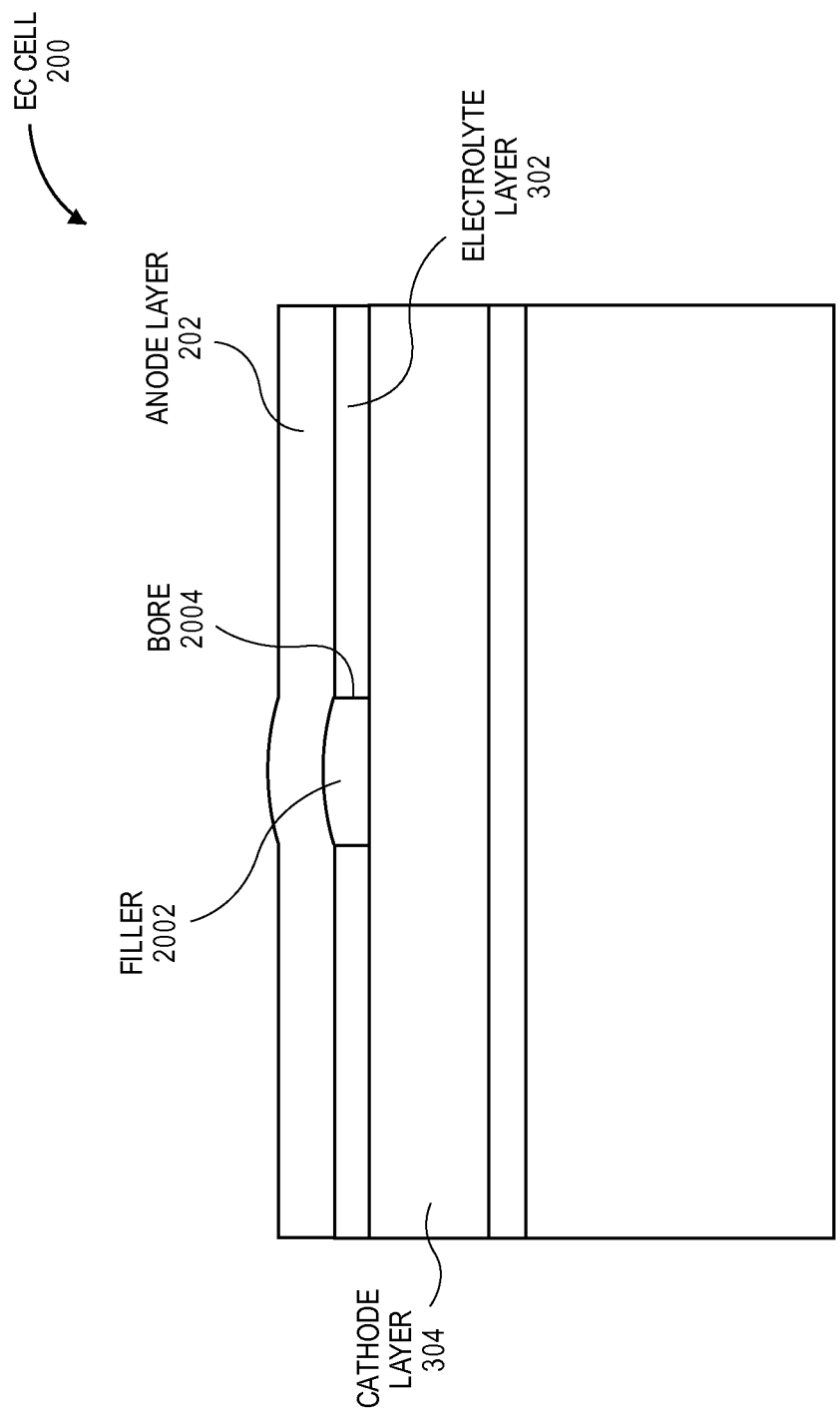
FIG. 20 is a side view of an electrochemical cell having a backfilled electrolyte layer in accordance with an embodiment.

Referring to FIG. 20, a side view of an electrochemical cell having a backfilled electrolyte layer is shown in accordance with an embodiment. In an embodiment, the void 402 detected in the precursor cell 1900 may be filled with a filler 2002. For example, the void 402 may be ablated, drilled, ground, etc., to form a bore 2004 through the electrolyte layer 302. The bore 2004 may enlarge the void in electrolyte layer 302, making it easier to insert a filler material. Furthermore, although the bore 2004 may be controlled to stop at an upper surface of the cathode layer 304, in an embodiment, the bore 2004 may extend into the cathode layer 304. After creating bore 2004, a filler material may be backfilled into the bore 2004. Thus, when the anode layer 202 is deposited in a subsequent operation, the cathode layer 304 may be electrically isolated from the anode layer 202 across filler 2002. Accordingly, the filler 2002 may include a variety of materials that may be inert to lithium, and which may be electrically insulating. The choice of materials may include adhesive materials that can be injected into the bore 2004 and then allowed to cure under, e.g., time, heat, and/or ultraviolet radiation.

Figure 21:
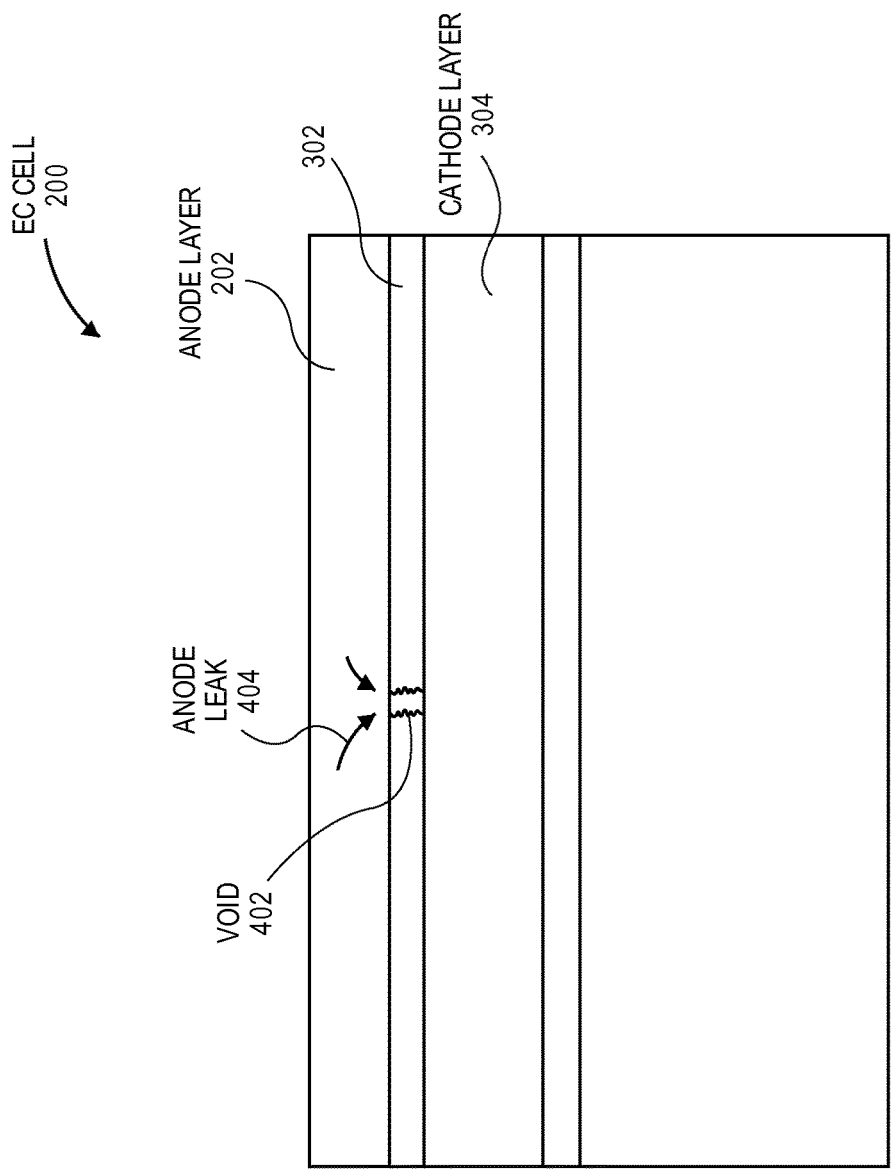
FIG. 21 is a side view of an electrochemical cell having a defect in an electrolyte layer in accordance with an embodiment.

Referring to FIG. 21, a side view of an electrochemical cell having a defect in an electrolyte layer is shown in accordance with an embodiment. In an embodiment, the void 402 in the electrolyte layer 302 may be detected after deposition of the anode layer 202. For example, one of the detection methods described above may be used to detect the void 402 prior to placing an anode current collector 310 over the anode layer 202. In an embodiment, the anode layer may be patterned to facilitate detection using voltage probing, as described above. Accordingly, a repair technique may be employed that isolates the cathode layer 304 from an anode leak 404 through the void 402.

Figure 22A:
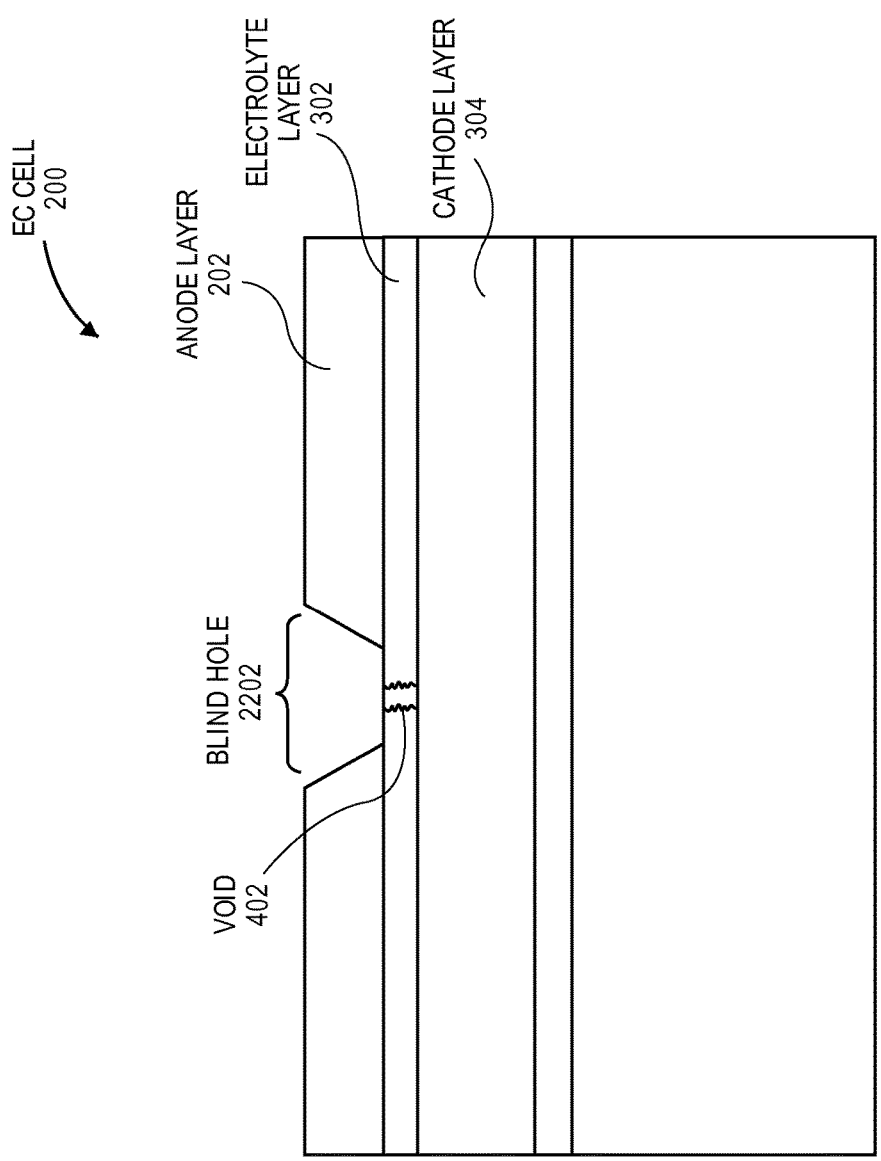
FIGS. 22A-22C are side views of an electrochemical cell having a cathode layer isolated from an anode leak in accordance with an embodiment.

Referring to FIG. 22A, a side view of an electrochemical cell having a cathode layer isolated from an anode leak is shown in accordance with an embodiment. In an embodiment, the anode layer 202 over the void 402 may be removed such that the void 402 does not extend from the anode layer 202 to the cathode layer 304. That is, the anode material is removed over a first end of the void 402, is not present above void 402, and thus cannot leak through the void. Accordingly, an anode leak 404 through the void 402 may not be established, and thus, the impact of void 402 on electrochemical cell 200 performance may be mitigated. Removal of the anode layer 202 may include forming a blind hole 2202 over the void 402. An inner dimension of the blind hole 2202 may be at least as large as the void 402 diameter and the bottom of the blind hole 2202 may terminate at or below an upper surface of the electrolyte layer 302. Accordingly, the repaired electrochemical cell 200 may have no anode layer 202 material adjacent to the void 402, and the risk of an anode leak 404 occurring may therefore be reduced.

Figure 22B:
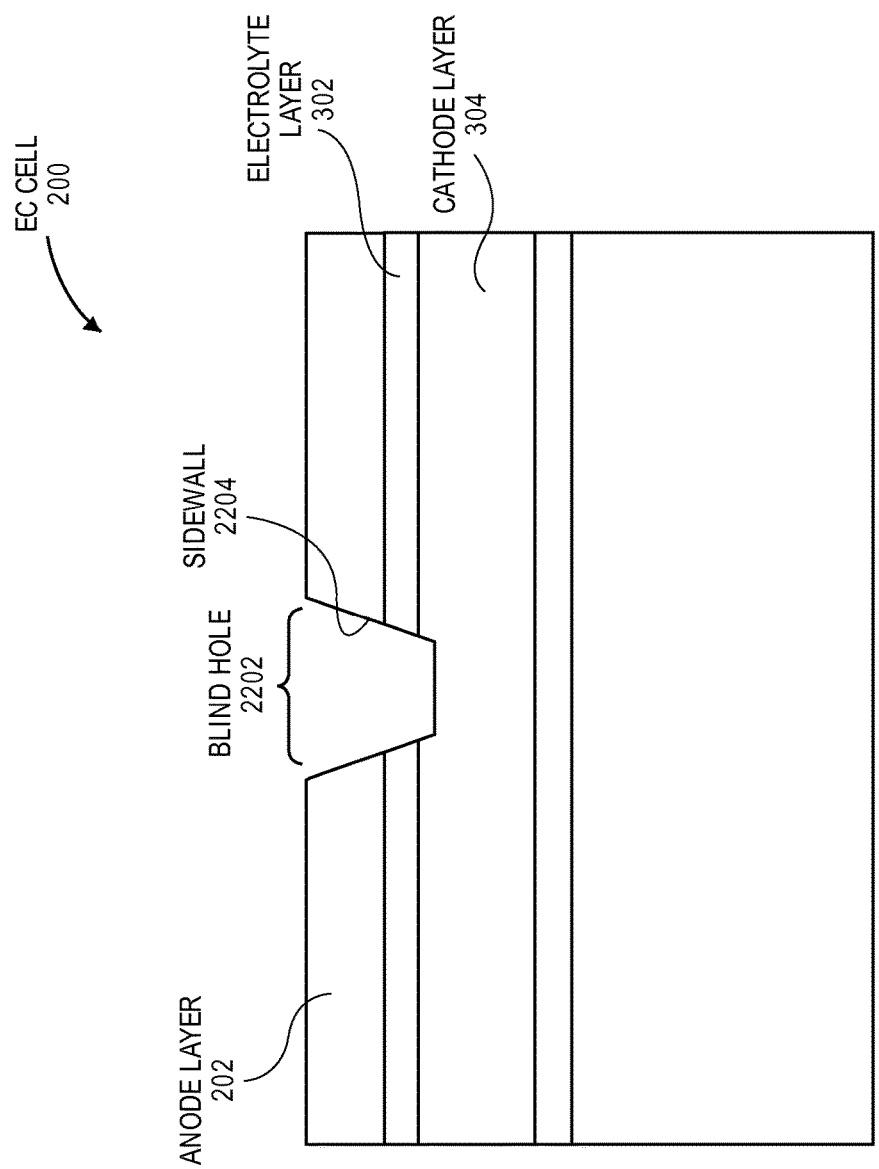

Referring to FIG. 22B, a side view of an electrochemical cell having a cathode layer isolated from an anode leak is shown in accordance with an embodiment. In an embodiment, the anode layer 202 and the void 402 may be removed to isolate the cathode layer 304 from the anode layer 202. More particularly, a blind hole 2202 may be formed through the anode layer 202 and the electrolyte layer 302 to remove the void 402. A sidewall 2204 of the blind hole 2202 may be contiguous such that each layer along the sidewall 2204 is electrically isolated and essentially continuous with one another, e.g., as in having a tapered sidewall 2204. That is, although the sidewalls 2204 of the anode layer 202 and the electrolyte layer 302 may be essentially continuous with one another, the anode layer 202 may be sufficiently isolated from the cathode layer 304 to reduce the likelihood of anode layer 202 material from electrically shorting with the cathode layer 304. Accordingly, the repaired electrochemical cell 200 may reduce the risk of an anode leak 404 occurring in an assembled solid-state battery.

Figure 22C:
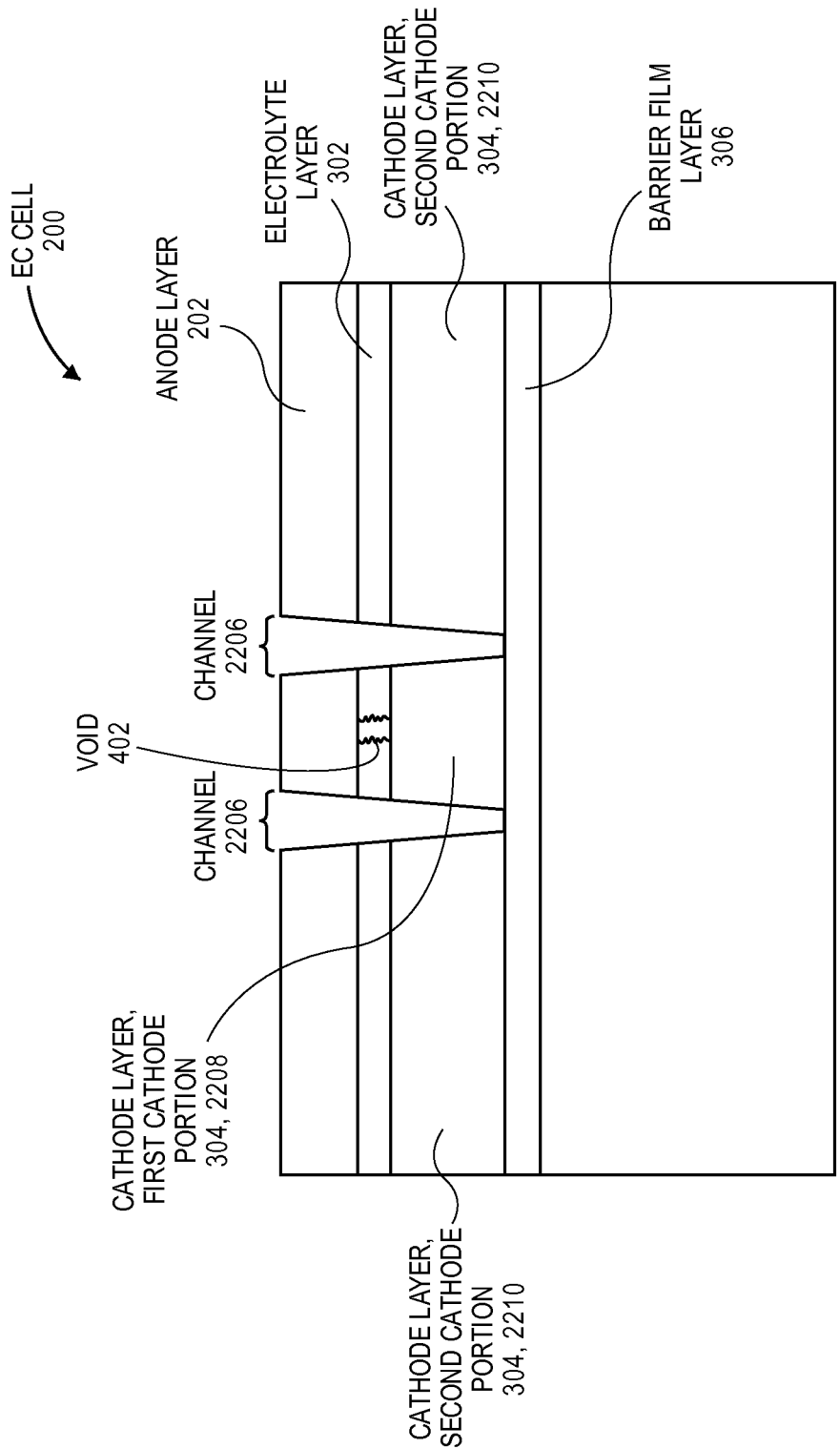

Referring to FIG. 22C, a side view of an electrochemical cell having a cathode layer isolated from an anode leak is shown in accordance with an embodiment. In an embodiment, rather than removing the anode layer 202 adjacent to the void 402, a portion of the cathode layer 304 may be isolated from the rest of the cathode layer 304 so that if an anode leak 404 occurs, the degraded region will be limited to a small fraction of the cathode layer 304. Thus, the impact on electrochemical cell performance may be reduced. In an embodiment, a channel 2206 may be formed around the void 402 to isolate a first cathode portion 2208 from a second cathode portion 2210. The channel 2206 may be annular having an inner wall that includes the first cathode portion 2208 sidewall and an outer wall that includes the second cathode portion 2210 sidewall. Furthermore, the channel 2206 may extend from an upper surface of the electrochemical cell 200 or precursor cell 1900 to the barrier film layer 306 (and may even extend below the top surface of barrier film layer 306 supporting cathode layer 304). Thus, the channel 2206 may create a discontinuity to physically isolate the cathode portions from each other. In an embodiment, the channel 2206 may be backfilled with, e.g., a dielectric filler, to further isolate the cathode portions physically, electrically, or ionically. Although an anode leak 404 may form between the anode layer 202 and the first cathode portion 2208, the first cathode portion 2208 volume may be small so as to cause the entire portion to chemically react and to then cease to support further propagation of the chemical reaction to nearby areas of the cathode layer 304. Accordingly, the repaired electrochemical cell 200 may reduce the impact of an anode leak 404 on electrochemical cell 200 performance.

The various repair modifications described above with respect to isolating the cathode layer 304 may be made using a variety of fabrication technologies. For example, a bore 2004, a blind hole 2202, or a channel 2206 may be formed through one or more layers of the electrochemical cell 200 using, e.g., laser machining techniques such as laser ablation, abrasive jet machining, etching, etc. Some of these processes, such as laser ablation, can remove portions of material layers, such as a thin top layer from barrier film layer 306, without melting and cutting through the entire material thickness, as is typically the case with conventional laser cutting processes. Furthermore, modifications that involve the addition of materials, such as backfilling the bore 2004 with the filler 2002, may be performed using material application techniques such as coating, infusion, deposition, etc. Accordingly, the impact of electrolyte layer defects on product cost and performance may be mitigated by detecting and repairing the defects.

The present invention also provides the following itemized embodiments:

1. An electrochemical cell, comprising: an electrolyte layer between an anode layer and a cathode layer, wherein the electrolyte layer includes a hole at least partially filled by a filler, and wherein the filler separates the anode layer from the cathode layer.

2. An electrochemical cell, comprising: an electrolyte layer between an anode layer and a cathode layer, wherein the electrolyte layer includes a void extending from a first end to the cathode layer, and wherein the anode layer includes a hole over the void such that the hole separates the void from the anode layer.

3. An electrochemical cell, comprising: an electrolyte layer between an anode layer and a cathode layer, wherein the electrolyte layer includes a void; and a channel extending through the electrolyte layer and the cathode layer around the void, such that a first region of the cathode layer is separated from a second region of the cathode layer by the channel.

4. A method, comprising: detecting a void in an electrolyte layer, wherein the void extends from a first end to a cathode layer of an electrochemical cell; and isolating the cathode layer from the first end.

5. The method of item 4, wherein the electrolyte layer is between the cathode layer and an anode layer, and wherein detecting the void includes measuring an electrical voltage at one or more anode subregions of the anode layer.

6. The method of item 4, wherein isolating the cathode layer includes filling the void with a filler to separate the cathode layer from the first end.

7. The method of item 4 further comprising depositing an anode layer over the electrolyte layer such that the void extends from the anode layer to the cathode layer, and wherein isolating the cathode layer includes removing the anode layer over the void such that the void does not extend from the anode layer to the cathode layer.

8. The method of item 4 further comprising depositing an anode layer over the electrolyte layer such that the void extends from the anode layer to a first region of the cathode layer, and wherein isolating the cathode layer includes forming a channel around the void through the electrolyte layer and the cathode layer, such that the first region of the cathode layer is separated from a second region of the cathode layer by the channel.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An electrochemical cell, comprising:
   a cathode current collector having a continuous layer structure;
   a cathode layer having a plurality of cathode subregions electrically connected to each other through the continuous layer structure of the cathode current collector, wherein the plurality of cathode subregions are separated by a first gap, and wherein the gap is at least partially filled by a dielectric gas;
   an anode layer having a plurality of anode subregions positioned on each of the plurality of cathode subregions and separated by a second gap, the second gap at least partially filled by a dielectric gas; and
   an electrolyte layer between the plurality of cathode subregions and the anode layer.

2. The electrochemical cell of claim 1, wherein the combined projected surface area of the cathode subregions is at least 80 percent of a total projected surface area of the cathode layer.

3. The electrochemical cell of claim 2 further comprising an anode current collector electrically connected to the anode layer.

4. The electrochemical cell of claim 1, wherein the anode current collector includes a continuous layer structure, and wherein the plurality of anode subregions are electrically connected to each other through the continuous layer structure of the anode current collector.

5. An electrochemical cell, comprising:
   an anode current collector having a continuous layer structure;
   an anode layer having a plurality of anode subregions electrically connected to each other through the continuous layer structure of the anode current collector;
   an electrolyte layer between the plurality of anode subregions and a cathode layer; and
   a cathode current collector electrically connected to the cathode layer,
   wherein the plurality of anode subregions are separated by a first gap defined by adjacent anode subregions, the anode current collector and the electrolyte layer, and wherein the gap is at least partially filled by a dielectric gas,
   the cathode layer includes a plurality of cathode subregions, wherein at least two anode subregions are disposed over each cathode subregion,
   the cathode subregions are separated from each other by a second gap extending between the anode current collector and the cathode current collector, wherein the second gap is at least partially filled by a dielectric gas.

6. The electrochemical cell of claim 5, wherein a combined projected surface area of the anode subregions is less than 25 percent of a total projected surface area of the anode layer.

7. The electrochemical cell of claim 5, wherein the cathode subregions are electrically connected to each other through the continuous layer structure of the cathode current collector.

8. The electrochemical cell of claim 7, wherein a combined projected surface area of the cathode subregions is at least 80 percent of a total projected surface area of the cathode layer.

* * * * *